United States Patent
Kyusojin et al.

(10) Patent No.: US 8,645,668 B2
(45) Date of Patent: *Feb. 4, 2014

(54) INFORMATION PROCESSING APPARATUS, INFORMATION PROCESSING METHOD AND COMPUTER PROGRAM

(75) Inventors: Hiroshi Kyusojin, Tokyo (JP); Yuji Kawamura, Kanagawa (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 1402 days.

This patent is subject to a terminal disclaimer.

(21) Appl. No.: 11/971,791

(22) Filed: Jan. 9, 2008

(65) Prior Publication Data

US 2008/0172682 A1    Jul. 17, 2008

(30) Foreign Application Priority Data

Jan. 11, 2007   (JP) ................................ 2007-002986
Nov. 15, 2007   (JP) ................................ 2007-296676

(51) Int. Cl.
    *G06F 15/00*     (2006.01)

(52) U.S. Cl.
    USPC ................................ 712/1; 712/233; 710/260

(58) Field of Classification Search
    USPC ................ 709/318, 321; 710/260; 712/1, 233
    See application file for complete search history.

(56) References Cited

U.S. PATENT DOCUMENTS

| | | | | |
|---|---|---|---|---|
| 6,434,651 | B1 * | 8/2002 | Gentry, Jr. ..................... | 710/260 |
| 6,631,422 | B1 * | 10/2003 | Althaus et al. ................ | 709/250 |
| 7,783,810 | B2 * | 8/2010 | Kyusojin et al. .............. | 710/268 |
| 2004/0030757 | A1 * | 2/2004 | Pandya ......................... | 709/217 |
| 2005/0114463 | A1 * | 5/2005 | Lee ................................ | 709/208 |
| 2006/0004904 | A1 * | 1/2006 | Sarangam et al. ............ | 709/200 |
| 2006/0174246 | A1 | 8/2006 | Tamura et al. | |

FOREIGN PATENT DOCUMENTS

| | | |
|---|---|---|
| JP | 64-028735 | 1/1989 |
| JP | 2-201569 | 8/1990 |
| JP | 03-223955 | 10/1991 |
| JP | 5-61812 | 3/1993 |
| JP | 06-223047 | 8/1994 |
| JP | 6-266676 | 9/1994 |
| JP | 2000-181886 | 6/2000 |
| JP | 2006-209479 | 8/2006 |
| JP | 2006-303750 | 11/2006 |
| JP | 2007-12021 | 1/2007 |

(Continued)

OTHER PUBLICATIONS

Robert Craig, Dennis Keefe, and Paul Leroux, "Making the Most of Multi-Core Processors: Part 1", Mar. 27, 2006, Embedded.com.*

(Continued)

*Primary Examiner* — Andy Ho
(74) *Attorney, Agent, or Firm* — Finnegan, Henderson, Farabow, Garrett & Dunner, LLP

(57) ABSTRACT

A sub-processor different from the main processor executing control in the operating system (OS) is designated to control a device driver corresponding to a communication unit and thus, the communication control is executed by the sub-processor in response to an interrupt originating from a network card functioning as the communication unit in an information processing apparatus equipped with a plurality of processors and engaged in communication via a network. The structure enables the main processor to execute data processing with a high level of efficiency without a time lag in the data processing.

19 Claims, 20 Drawing Sheets

(56) References Cited

FOREIGN PATENT DOCUMENTS

| JP | 2007-206955 | 6/2007 |
| JP | 2007-214730 | 6/2007 |
| JP | 2007-206955 | 8/2007 |
| JP | 2007-208632 | 8/2007 |
| JP | 2007-214730 | 8/2007 |
| JP | 2007-214731 | 8/2007 |
| WO | WO2006/137234 | 12/2006 |

OTHER PUBLICATIONS

Cell Broadband Engine Architecture Version 1.01, Oct. 3, 2006, Sony Computer Entertainment Inc.
U.S. Appl. No. 11/669,766, filed Jan. 31, 2007, Kyusojin et al.

* cited by examiner

| IP ADDRESS | CORRESPONDING SNR |
|---|---|
| 192.168.0.10 | SNR CORRESPONDING TO PPU |
| 192.168.0.11 | SNR CORRESPONDING TO SPU-1 |
| 192.168.0.12 | SNR CORRESPONDING TO SPU-2 |
| 192.168.0.13 | SNR CORRESPONDING TO SPU-3 |
| ⋮ | ⋮ |

IOPT (I/O PAGE TABLE)

I/O ADDRESS SPACE
(NETWORK CARD ADDRESS SPACE)

EFFECTIVE ADDRESS SPACE
(EA ADDRESS SPACE)

US 8,645,668 B2

INFORMATION PROCESSING APPARATUS, INFORMATION PROCESSING METHOD AND COMPUTER PROGRAM

CROSS REFERENCES TO RELATED APPLICATIONS

The present invention contains subject matter related to Japanese Patent Application JP 2007-002986 filed in the Japan Patent Office on Jan. 11, 2007, the entire contents of which being incorporated herein by reference.

BACKGROUND OF THE INVENTION

1. Field of the Invention

The present invention relates to an information processing apparatus, an information processing method and a computer program. More specifically, the present invention relates to an information processing apparatus assuming a multiprocessor configuration to execute data processing by utilizing a plurality of processors, an information processing method to be adopted in such an information processing apparatus and a computer program, with which a decrease in the data processing efficiency attributable to, for instance, communication processing, is prevented.

2. Description of the Related Art

Today, information processing apparatuses such as PCs assuming a multiprocessor configuration with multiple processors (CPUs) installed therein are utilized widely in applications in which various types of data processing are executed by concurrently engaging the plurality of processors in operation. A multiprocessor environment in which different types of data processing are executed by allocating a specific role to one of the plurality of CPUs is called an asymmetrical multiprocessor environment.

In an asymmetrical multiprocessor environment such as that described above, a main CPU (hereafter referred to as a "PPU" (power processor unit)) and a plurality of sub-CPUs (hereafter referred to as "SPUs" (synergistic processor units)) may be installed. The individual processors may be designated to execute different types of processing as follows;

(1) The PPU executes processing based upon an OS.
(2) The SPUs each executes processing corresponding to a specific function such as an encode/decode function or a DSP (digital signal processor) function especially engaged in audio or image processing.

It is to be noted that the SPUs are designed to have better versatility for general-purpose program execution than standard DSPs assure greater processing advantages that the DSPs. FIG. 1 presents an example of hierarchical layers that may be assumed for data processing executed in conjunction with network communication in an information processing apparatus equipped with asymmetrical multiprocessors. As shown in FIG. 1, a network card 101 used to execute data communication assumes the lowermost layer and processors engaged in data processing execution are set in a higher-order hierarchical layer relative to the network card. A PPU 111 is a primary processor engaged in OS execution. The SPUs 121-n are processors each engaged in the execution of a specific type of processing assigned thereto.

The PPU 111 controls programs 130 such as a driver 131 that drives the network card and a protocol stack 132 corresponding to the communication protocol, e.g., TCP/IP in addition to executing the OS. An application 140, which issues a request for communication processing execution, is set in the highest-order layer. As shown in FIG. 1, the protocol stack 132, the driver 131 and the like operate on the PPU 111, i.e., the main processor, together with the OS and an interrupt from the network card 101 is also processed in the PPU 111.

It is to be noted that a descriptor such as that shown in FIG. 2 is utilized when a transmission target packet or a received packet is transferred between a memory used as a transmission target data acquisition location or a received data storage location and the network card during the execution of communication processing. A descriptor is identification data used for memory access and may be constituted with, for instance, an address field indicating the specific location in the memory at which the packet to constitute the communication data is present, a length field indicating the packet size and a status field indicating the transmission/reception status, as shown in FIG. 2.

As explained earlier, an interrupt from the network card 101 is processed by the PPU 111, i.e., the main processor that controls the OS, in the information processing apparatus shown in FIG. 1. The flow of packet transmission/reception executed by the PPU 111 is now explained in reference to the flowchart presented in FIG. 3.

First, in response to a communication processing request originating from the application, the PPU 111 secures a memory area in preparation for packet transmission/reception and sets a descriptor corresponding to the secured memory area based upon the driver 131 in step S101. In step S102, notification processing is executed to provide information on the descriptor having been set to the network card. This notification processing is executed by, for instance, writing the information into a register for the network card 101.

Next, in step S103, data transmission/reception is executed via the network card 101 in accordance with the descriptor. Following step S103, interrupt processing for the PPU 111 occurs in step S104. Based upon the interrupt processing, the PPU 111 executes predetermined post-communication processing by, for instance, releasing the memory space.

Different types of processing are executed for data transmission and for data reception during the data transmission/ reception processing executed in step S103 via the network card 101. The data transmission processing and the data reception processing are now explained in detail in reference to FIGS. 4 and 5.

(Data Transmission Processing)

FIG. 4 presents a flowchart of the data transmission processing executed in conformance to the descriptor via the network card 101.

As shown in FIG. 4, via the network card 101 engaged in the data transmission processing, the descriptor is read out in step S121 and then DMA (direct memory access) is started in step S122 based upon the values indicated in the descriptor, i.e., the address and the length, before ending the DMA in step S123. Through this processing, transmission target data are read out from the memory. In step S124, the network card 101 writes the results of the DMA indicating success/failure of the DMA, i.e., indicating whether or not the memory access has been achieved, into the status field in the descriptor and if the data have been read out from the memory successfully, data transmission is executed via the network card 101.

Next, in step S125, a decision is made via the network card 101 as to whether or not there is any remaining descriptor yet to be processed and if it is decided that there is an unprocessed descriptor, the processing is repeatedly executed starting from step S121. Once there is no more unprocessed descriptor, the operation proceeds to step S126. Subsequently the transmission/reception status indicating success/failure of the data transmission is written into the register corresponding to the network card (step S126) and then, interrupt notification processing for the PPU is executed (step S127).

(Data Reception Processing)

The network card 101 engaged in the data reception processing first reads out the descriptor (step S131), as shown in FIG. 5. After confirming packet reception in step S132, DMA (direct memory access) is executed based upon the values indicated in the descriptor, and the received data are written into the memory (steps S133 and S134).

Next, the network card 101 writes the DMA results indicating success/failure of the DMA having been executed in step S133 and step S134, i.e., whether or not a memory access has been achieved, into the status field in the descriptor and also writes the actual packet size into the length field (step S135). In step S136, the transmission/reception status indicating success/failure of the data reception is written into the register corresponding to the network card and in step S137, interrupt notification processing for the PPU 111 is executed.

Once the data transmission/reception processing executed via the network card 101 through the DMA is completed, interrupt processing is executed at the PPU 111. The sequence of the interrupt processing executed at the PPU 111 in response to the interrupt notification from the network card is now explained in reference to the flowchart presented in FIG. 6.

As the interrupt from the network card 101 is received at the PPU in step S141, processing for halting the process currently underway is executed by, for instance, executing a register clear (step S142). An interrupt handler is then started up (step S143). FIG. 7 presents a flowchart of the interrupt handler startup processing.

The PPU executes processing for reading out the network card status from the register corresponding to the network card in order to determine the cause of the interrupt (step S151). This status is the data transmission/reception status indicating success or an error in the data transmission/reception, having been written via the network card 101 in step S126 in FIG. 4 or step S136 in FIG. 5.

Next, the PPU 111 enters a state in which it makes a decision as to whether or not the status transmission has been completed (step S152) and if a "no" decision is made, it proceeds directly to execute the processing in step S154. If, on the other hand, a "yes" decision is made, it releases the memory area where the transmission target data have been stored (step S153) and then proceeds to execute the processing in step S154. If it is decided in step S154 that the status indicates that the reception has been completed, the PPU 111 hands the received packet over to the protocol stack (step S155). If it is decided in step S156 that the status indicates an error, the PPU 111 resets the network card (step S157). Finally, the PPU 111 clears the interrupt status in step S158 before the interrupt handler startup processing ends.

After executing the processing in the flowchart presented in FIG. 7 in step S143 in FIG. 6, the operation proceeds to step S144 to execute process-resumption processing by, for instance, recovering the contents of the register having been cleared.

In the structure described above, the PPU needs to halt the process currently underway whenever interrupt processing occurs. Accordingly, the process is bound to be halted increasingly often if interrupt processing occurs frequently during high-speed network communication. The interrupt processing, which readily leads to cache destruction or destruction of the memory access locality, is bound to take up significant processing time at the PPU, thus lowering the processing performance.

SUMMARY OF THE INVENTION

The present invention, having been completed by addressing the concerns discussed above, provides an information processing apparatus, an information processing method and a computer program, with which the data processing efficiency is sustained even when, for instance, data communication processing is executed.

According to an embodiment of the present invention, there is provided an information processing apparatus equipped with a plurality of processors, which includes a first processor that executes processing based upon an operating system, a communication unit that executes communication processing and a second processor that executes processing based upon a device driver corresponding to the communication unit.

Furthermore, according to another embodiment of the present invention, there is provided an information processing method to be adopted in an information processing apparatus equipped with a plurality of processors including: a step in which a second processor different from a first processor that executes processing based upon an operating system executes read processing to read out an interrupt status set by a communication unit and a step in which the second processor determines processing to be executed based upon the interrupt status having been read out and executes the processing thus determined.

Furthermore, according to another embodiment of the present invention, there is provided a computer program enabling an information processing apparatus equipped with a plurality of processors to execute communication processing control and including: a step in which a second processor different from a first processor that executes processing based upon an operating system executes read processing to read out an interrupt status set by a communication unit and a step in which the second processor determines processing to be executed based upon the interrupt status having been read out and executes the processing thus determined.

According to an embodiment of the present invention, a sub-processor different from the main processor that controls an operating system (OS), is engaged in control of a device driver corresponding to a communication unit and the sub-processor executes communication control based upon an interrupt originating from a network card functioning as the communication unit in an information processing apparatus equipped with a plurality of processors and engaged in communication via a network. As a result, data processing can be executed at the main processor with a high level of efficiency without a time lag.

DETAILED DESCRIPTION OF THE PREFERRED EMBODIMENTS

The following is a detailed explanation of the information processing apparatus, the information processing method and the computer program according to the present invention.

(Embodiment 1)

Figure 8:
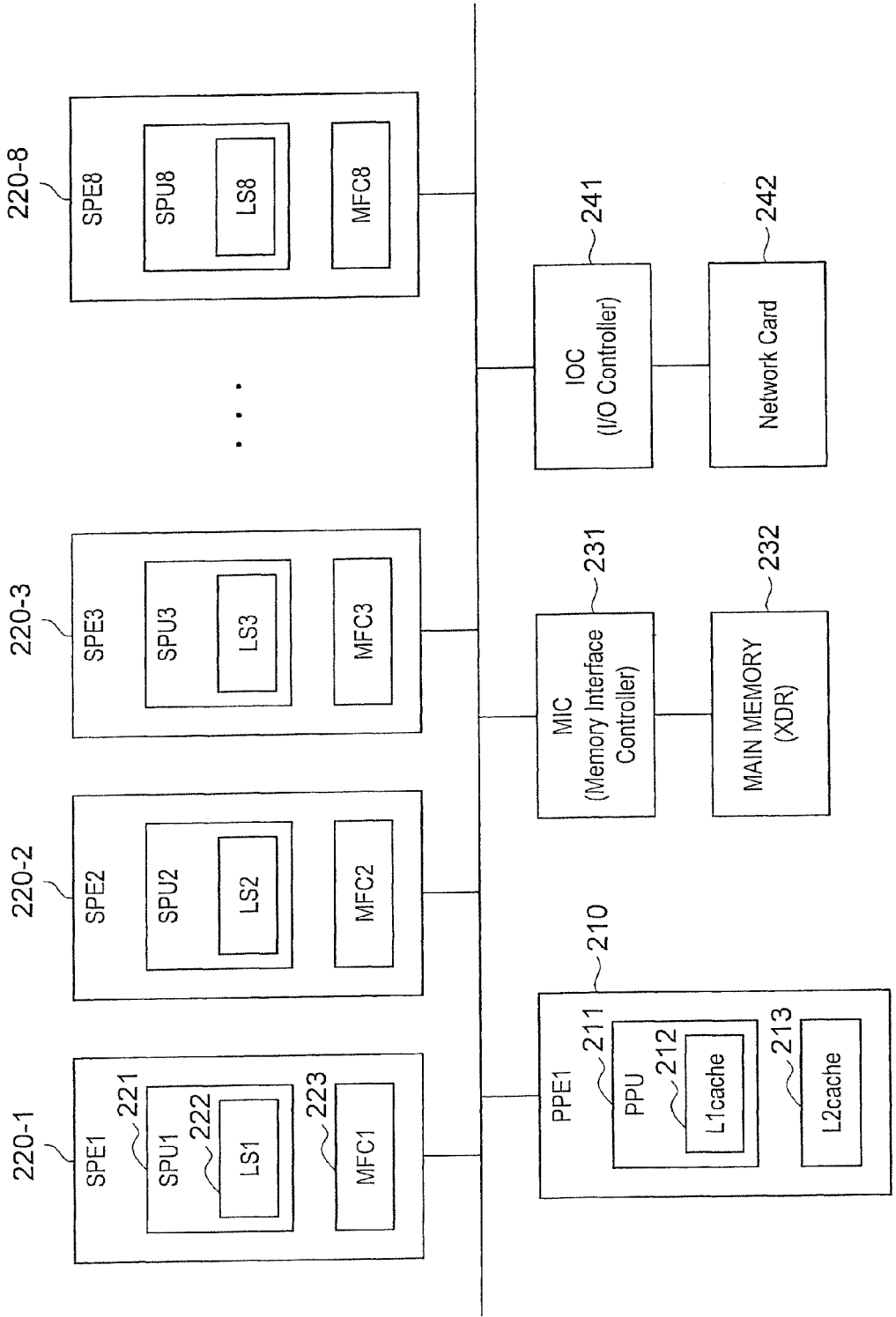
FIG. 8 presents an example of a structure that may be adopted in the information processing apparatus in an embodiment of the present invention.

First, in reference to FIG. 8, a structural example that may be adopted in the information processing apparatus in an embodiment of the present invention is described. The information processing apparatus according to the present invention, which operates in an asymmetrical multiprocessor environment similar to that described earlier, includes a single PPU (power processor unit) and eight SPUs (synergistic processor units).

As shown in FIG. 8, the PPU 211 is structured in a PPE (power processor element) 210, whereas the eight SPUs 221 are each structured in a separate SPE (synergistic processor element) 220. The PPU 211 functions as a main processor that controls the OS, whereas the eight SPUs 221 are sub-processors each engaged in the execution of a specific type of processing assigned thereto.

The PPE 210 includes a two-stage cache memory constituted with an L1 cache 212 and an L2 cache 213. The SPEs 220 each include a memory space referred to as a local store (LS) 222 capable of executing operation at a speed equivalent to that of the L1 cache. An SPE 220 accesses a main memory (XDR) 232 primarily through DMA via a memory flow controller (MSC) 223. As shown in the figure, the main memory (XDR) 232 is connected via a memory interface controller (MIC) 231, and a network card 242 to function as a communication unit is connected via an input/output controller (IOC) 241.

Figure 9:
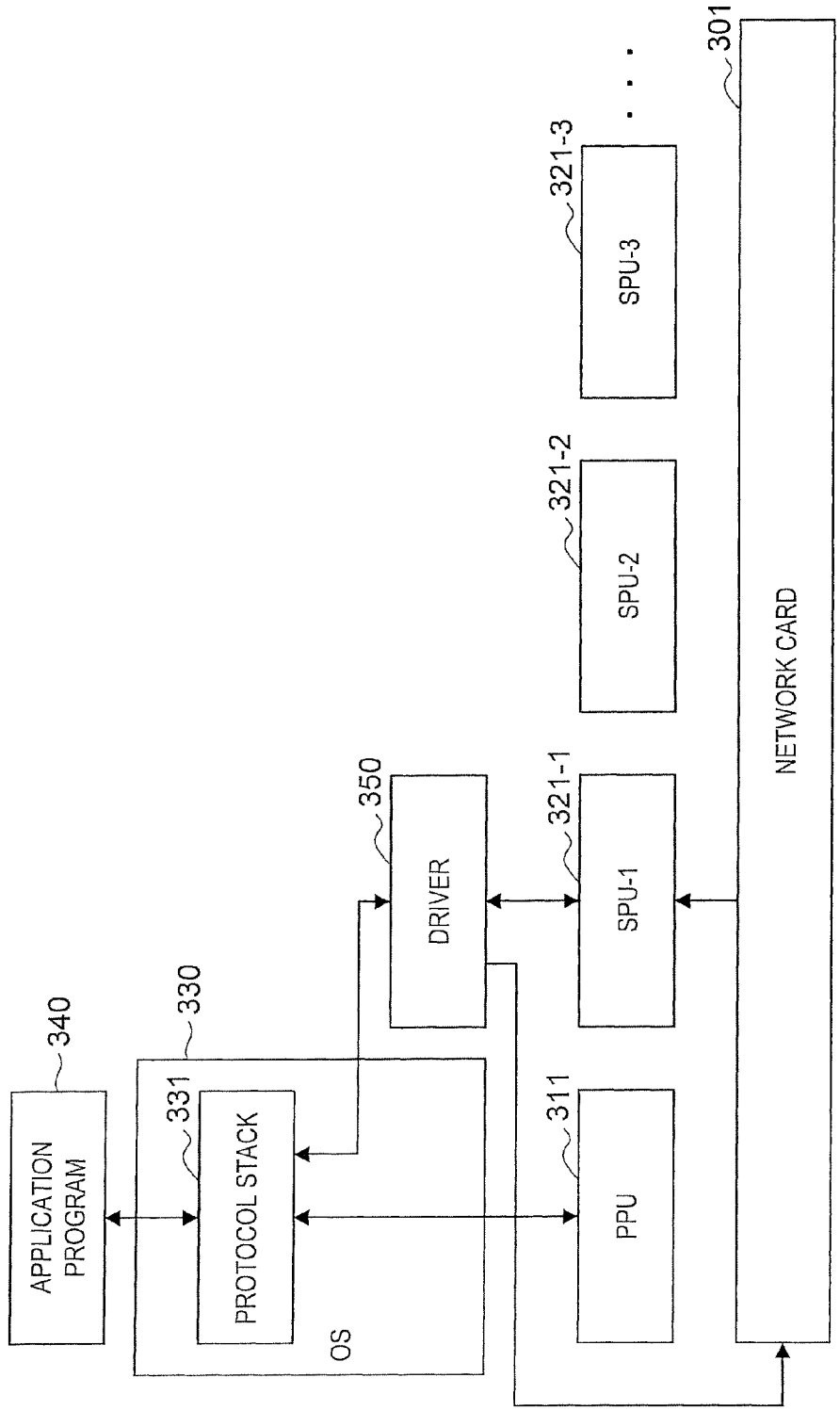
FIG. 9 shows the layer structure assumed for the processing hierarchical layers in the information processing apparatus in a first embodiment of the present invention.

In reference to FIG. 9, the layer structure assumed for the processing hierarchical layers in the information processing apparatus in the first embodiment of the present invention is explained. FIG. 9 shows the processing hierarchical layers assumed during network communication execution. As shown in FIG. 9, the device driver corresponding to the network card is installed at a specific sub-processor SPU in the first embodiment of the present invention.

In FIG. 9, a network card 301 functioning as the communication unit through which data communication is executed, assumes the lowermost layer and the processors to be engaged in data processing execution are set in a higher-order layer relative to the network card. It is to be noted that the "communication unit" in the scope of patent claims may be equivalent to the network card 301, that the "first processor" may be equivalent to the PPU 111 and that the "second processor" may be equivalent to the SPU1~SPU8.

The PPU 311 executes programs 330 such as an OS 330 and a protocol stack 331 corresponding to the communication protocol, e.g., TCP/IP. The protocol stack 331 is a communication control program used to control data communication executed via the network card 301. In the highest-order layer, an application 340 that issues a request for the execution of data communication via the network card 301 is set.

In the symmetrical multiprocessor environment in the related art the driver-based processing is executed by the PPU as explained earlier. Thus, as packet transmission/reception takes place, interrupt processing is executed, resulting in a temporary halt in the process currently underway at the PPU. Such a halt in the processing at the PPU attributable to the interrupt lowers the performance level of the PPU unexpectedly, leading to an undesirable condition in which the capability of the processor cannot be fully utilized.

In addition, if a packet transmission/reception is executed by applying an interrupt to the PPU, a delay occurs before;
(1) the memory is released following the packet transmission
(2) the packet having been received is transferred to the protocol stack and
(3) the handler is started up.

In order to absorb these delays, the buffer needs to assure an ample capacity margin necessitating wasteful utilization of buffer resources.

There is an added concern to be addressed on the network card side in that the wide network band available for use may not be effectively utilized in the communication due to the bottleneck manifesting with regard to the PPU processing capability.

Since the cause of these conditions is assumed to lie in the fact that the PPU is assigned to handle the packet transmission/reception, a driver 350 corresponding to the network card 301 is installed in one of the SPUs among SPU-1 through SPU-8 so as to execute processing based upon the driver 350 at one of the SPUs 1~8. In this structure, an interrupt from the network card 301 is processed at one of the SPUs 1~8, freeing the PPU from the processing that must be executed to engage the driver 350 and leaving all the programs executed on the PPU unaffected and uninterrupted by the interrupt processing. In addition, since a program other than the device driver is not executed in the SPU having installed therein the device driver among the SPUs 1~8 and thus no interrupt attributable to another application program occurs while interrupt processing executed to achieve DMA transfer is underway in the structure described above, faster response to an interrupt from the network card is enabled. Namely, since the transmission target data/received data can be transferred with higher frequency, the size of the buffer used in data transfer can be reduced.

It is to be noted that while the driver 350 is installed at the sub-processor SPU-1 (321-1) in the example presented in FIG. 9, the driver 350 may instead be installed at another sub-processor, e.g., the sub-processor SPU-2, instead of the sub-processor SPU-1 (321-1), and such an alternative configuration will not diminish the advantages of the embodiment in any way whatsoever.

In order to ensure that the device driver 350 operated via the SPU (321-1), is notified of an interrupt originating from the network card 301, as in the embodiment, the network card must be able to apply an interrupt to any processor in the multiprocessor environment.

Figure 10:
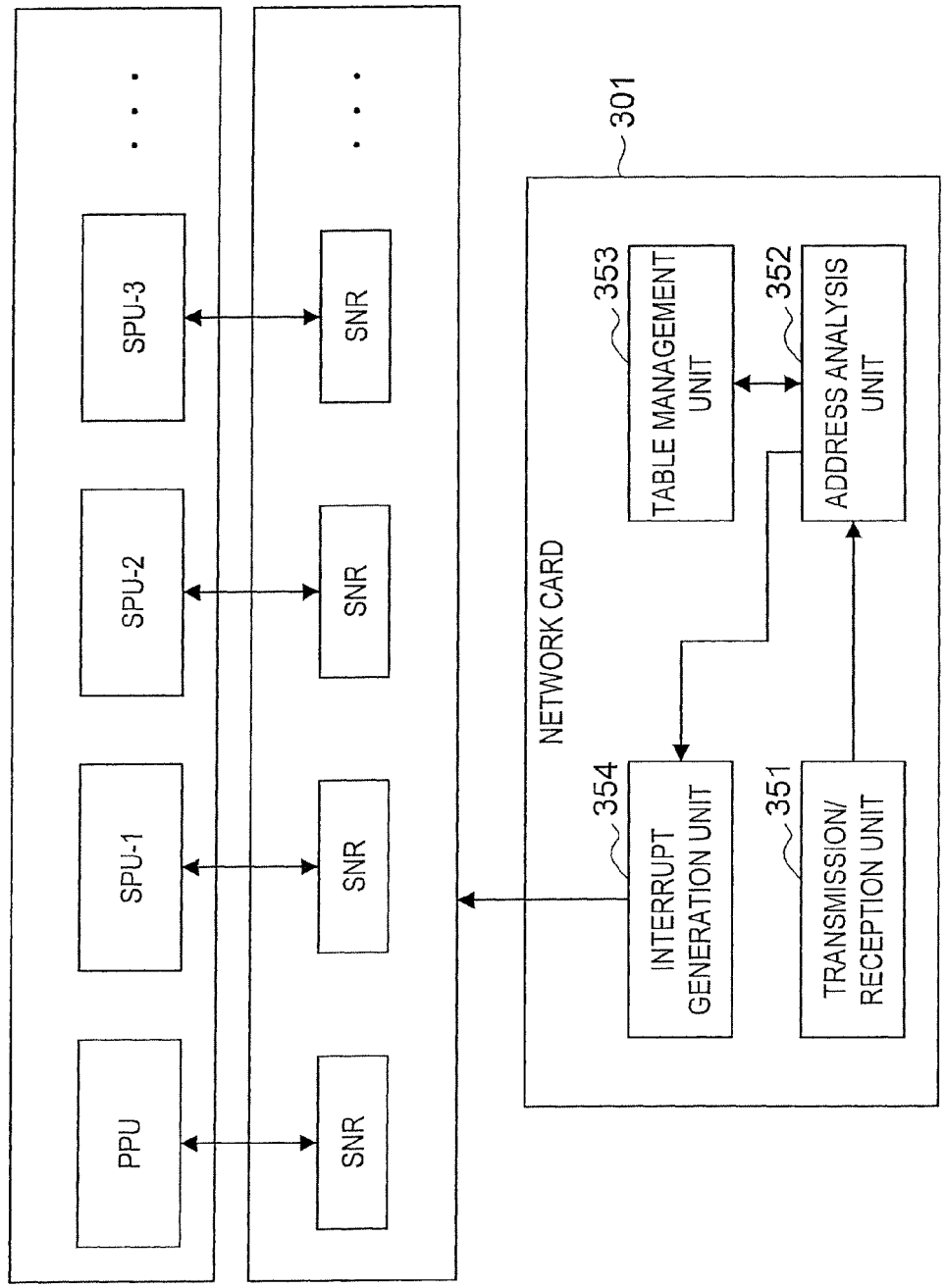
FIG. 10 is a block diagram, presenting an example of a functional structure that may be adopted in the network card.
Figures 11, 12:
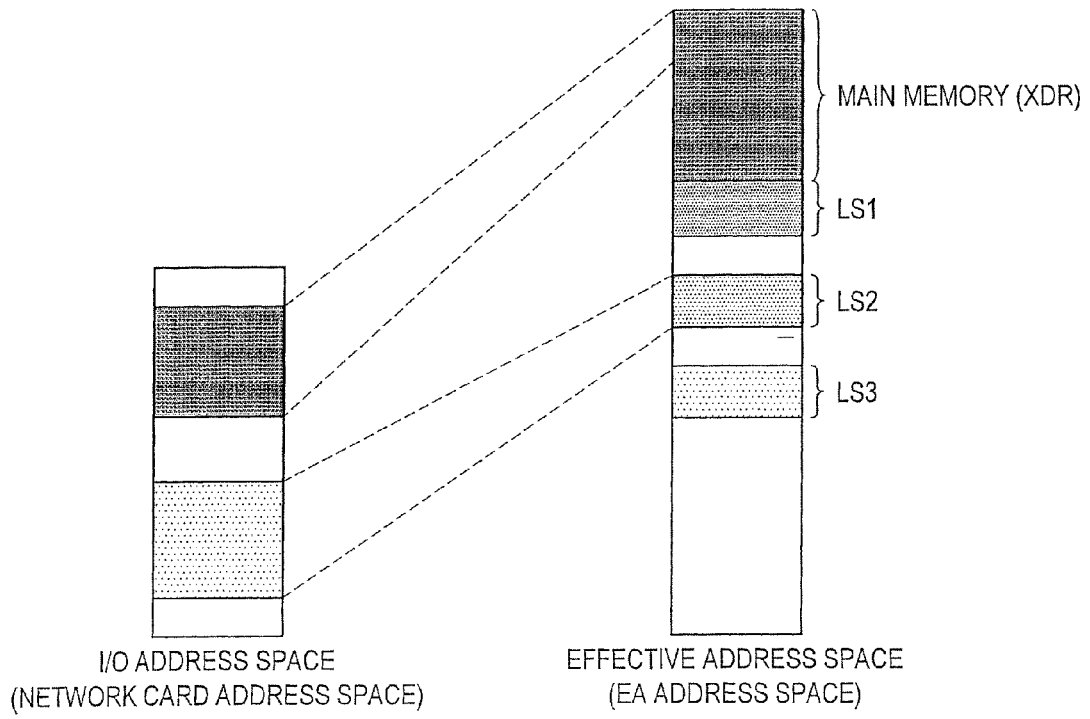
FIG. 11 presents an example of a structure that may be adopted in the table of IP addresses each set in correspondence to a specific SNR (signal notification register)
FIG. 12 illustrates processing executed to map the main memory (XDR) and the local stores (LSs) where transmission target data/received data are stored in relation to the I/O address space used as a network card address space.

An example of a structure that may be adopted in such a network card capable of applying an interrupt to any processor is explained in reference to FIGS. 10 and 11. FIG. 10 is a block diagram presenting an example of a functional structure that may be adopted in the network card 301. A transmission/reception unit 351 in the network card 301 obtains a signal transmitted to the network and receives data such as an Ethernet (registered trademark) frame or an IP packet to be received at the terminal where the network card 301 is installed, included in the data corresponding to the signal having been obtained from the network. It is to be noted that the transmission/reception unit 351 may execute data transmission/reception in compliance with any communication method, e.g., a wired communication method or a wireless communication method.

An address analysis unit 352 checks the recipient IP address indicated in the data (e.g., the IP packet) received by the transmission/reception unit 351 and executes a search of a table stored in a table management unit 353. At the table management unit 353, a table such as that shown in FIG. 11 containing IP addresses each set in correspondence to a specific SNR (signal notification register) is stored.

As shown in FIG. 10, an SNR is set in correspondence to each processor to be used to achieve synchronization with various types of devices. For instance, when any of the various devices built into the information processing apparatus is to apply an interrupt to a specific processor, data or the like indicating the occurrence of an interrupt are written into the SNR corresponding to the processor to which the interrupt is to be applied. Then, based upon the data written in the SNR, the corresponding processor executes interrupt processing by, for instance, transferring data provided by the device to a specific area in a memory (not shown).

The information processing apparatus achieved in this embodiment operates in an asymmetrical multiprocessor environment where a plurality of processors in the information processing apparatus each execute specific processing among various types of data processing. When data are received via the network card 301 in this apparatus, the specific processor to receive the data must first be identified before notifying the processor of the interrupt. Accordingly, a table such as that shown in FIG. 11 is referenced via the network card 301 so as to identify the specific recipient processor to receive the data.

For instance, the SNR corresponding to the received data (IP packet) is identified and an interrupt is applied to the identified processor based upon the table shown in FIG. 11 containing IP addresses, each assigned to a specific processor or a specific program such as an application program executed by the processor and each set in correspondence to a specific SNR (signal notification register).

More specifically, an interrupt generation unit 354 in the network card 301 shown in FIG. 10 generates an interrupt by notifying the specific SNR of the IP packet reception in response to a command issued by the address analysis unit 352. Namely, the interrupt generation unit 354 writes data or the like indicating that an interrupt has originated from the network card 301 into the SNR corresponding to the processor identified by the address analysis unit 352 based upon the table stored in the table management unit 353. The processor (e.g., the SPU-1) corresponding to the particular SNR then executes interrupt processing based upon the data having been written into the SNR.

It is to be noted that when the PPU 311 or the SPU 321 executes data communication via the network card 301 in the structure shown in FIG. 9, the main memory (XDR) or the local store (LS) used as a memory area where the transmission target data/received data are stored must be mapped in relation to the I/O address space used as the address space of the network card 301. In reference to FIG. 12, an explanation is given on how such mapping processing may be executed. The main memory (XDR) and the local store (LS) are mapped in a 64-bit address space referred to as an effective address (EA), so as to allow any effective address (EA) to be mapped in the I/O address space used as the address space of the network card 301 in any of various sizes (e.g., 4 kB, 64 kB, 1 MB or 16 MB). For instance, as a device accesses the address space for DMA to transfer a descriptor or packet data, an effective address (EA) is specified by using an I/O page table (IOPT) so as to map the main memory (XDR) or the local store (LS) used as the memory area where the transmission target data/received data are stored relative to the I/O address space used as the address space for the network card 301.

Since the SPU-1 (321-1) is designated to the execution of device driver, the embodiment achieves an added advantage in that the SPU can be continuously engaged in the execution of the device driver without affecting other programs. This means that transmission/reception completion processing can be executed through polling. The sequence of the polled data transmission/reception completion processing is now explained in reference to the flowchart presented in FIG. 13.

Figure 1:
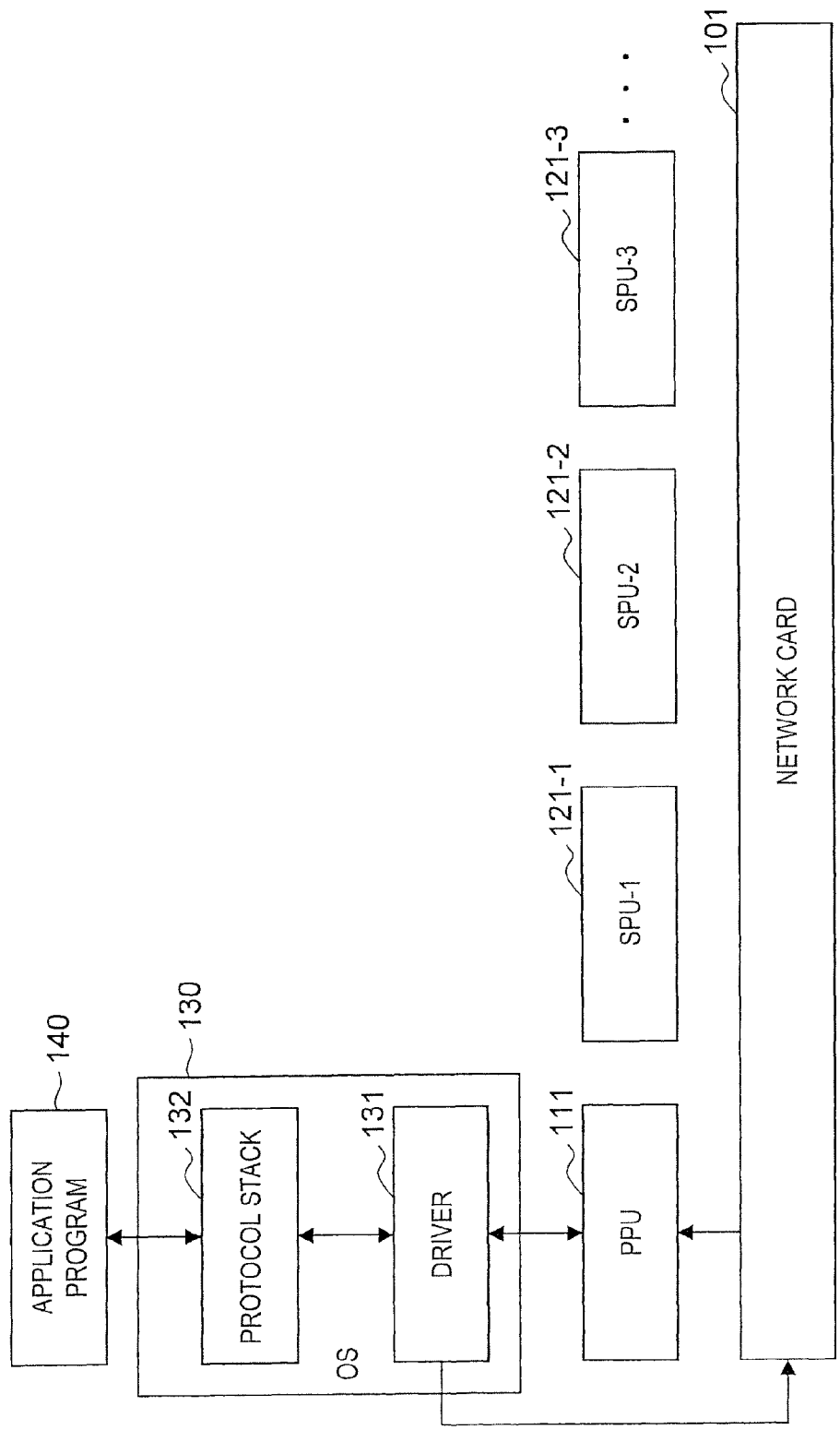
FIG. 1 presents an example of processing hierarchical layers that may be assumed when data processing is executed in conjunction with network communication in an information processing apparatus equipped with a CELL.
Figure 2:
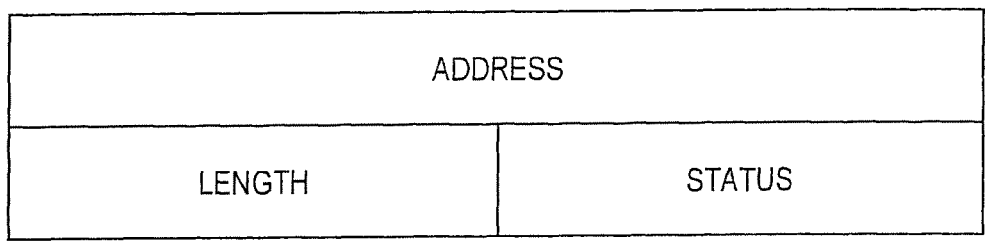
FIG. 2 presents a structural example that may be adopted in a descriptor.
Figure 3:
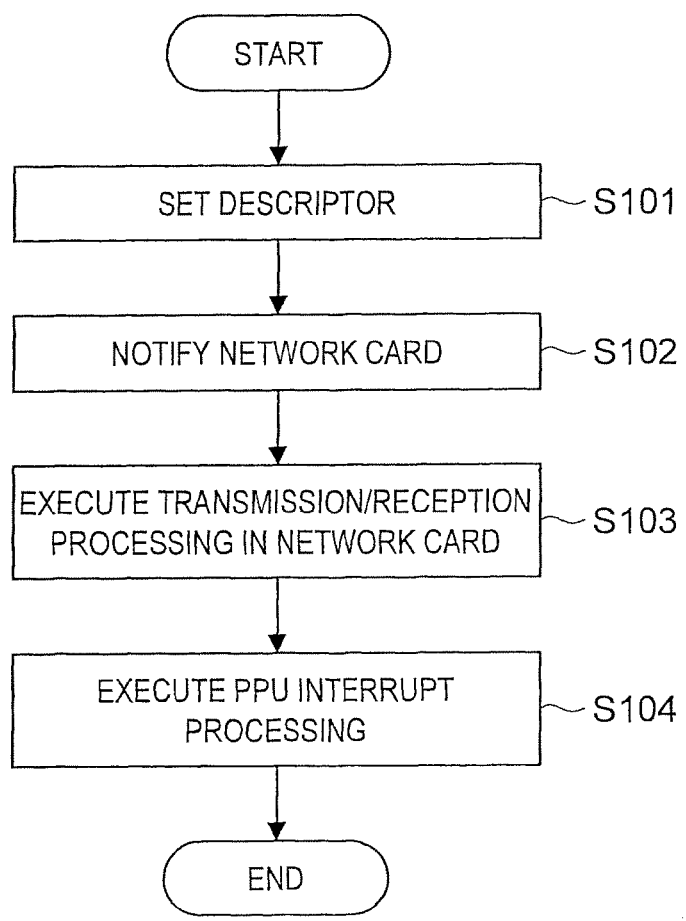
FIG. 3 presents a flowchart of packet transmission/reception executed by the PPU.
Figure 4:
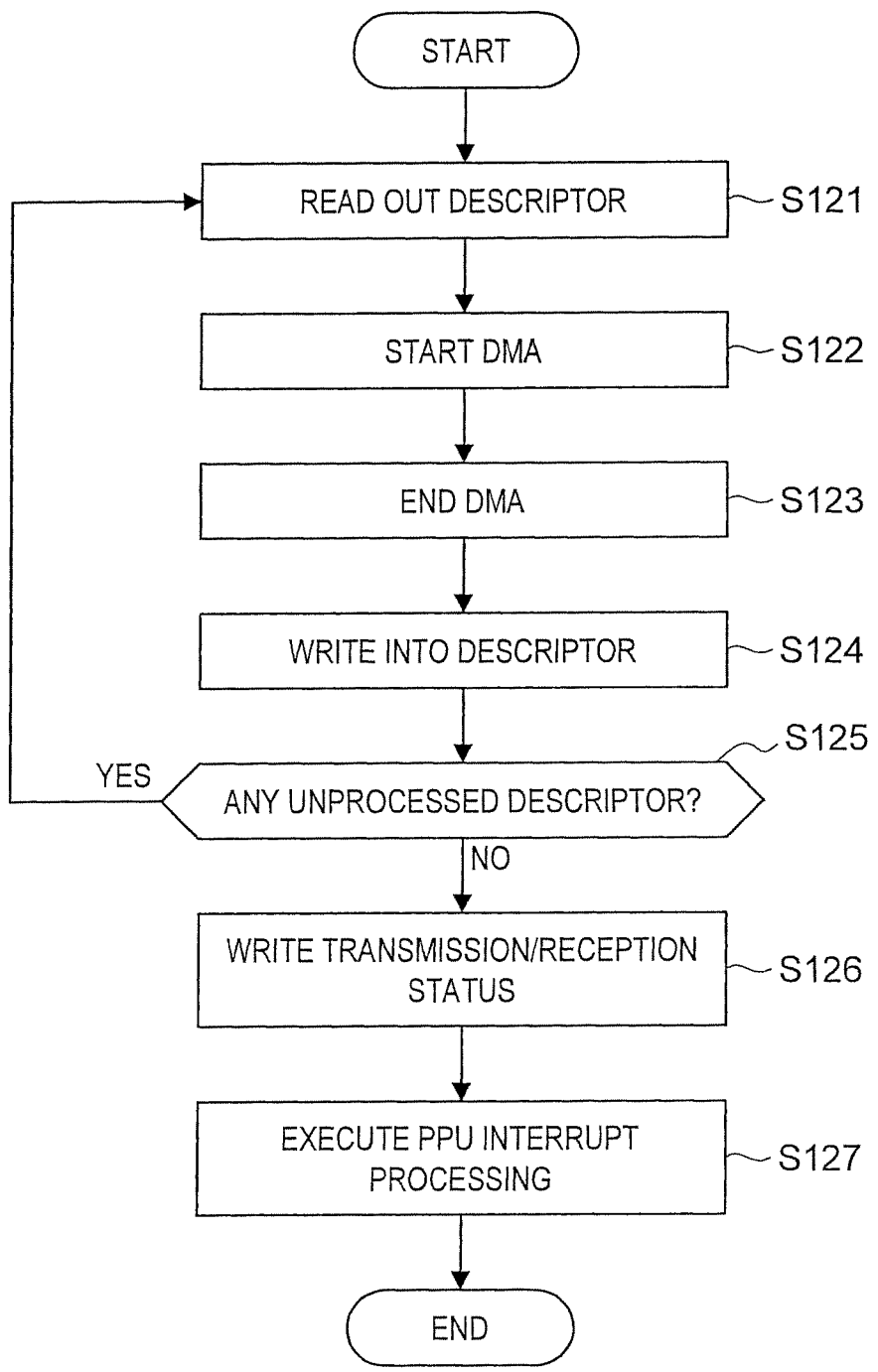
FIG. 4 presents a flowchart of the sequence of data transmission processing executed via the network card based upon the descriptor.
Figure 5:
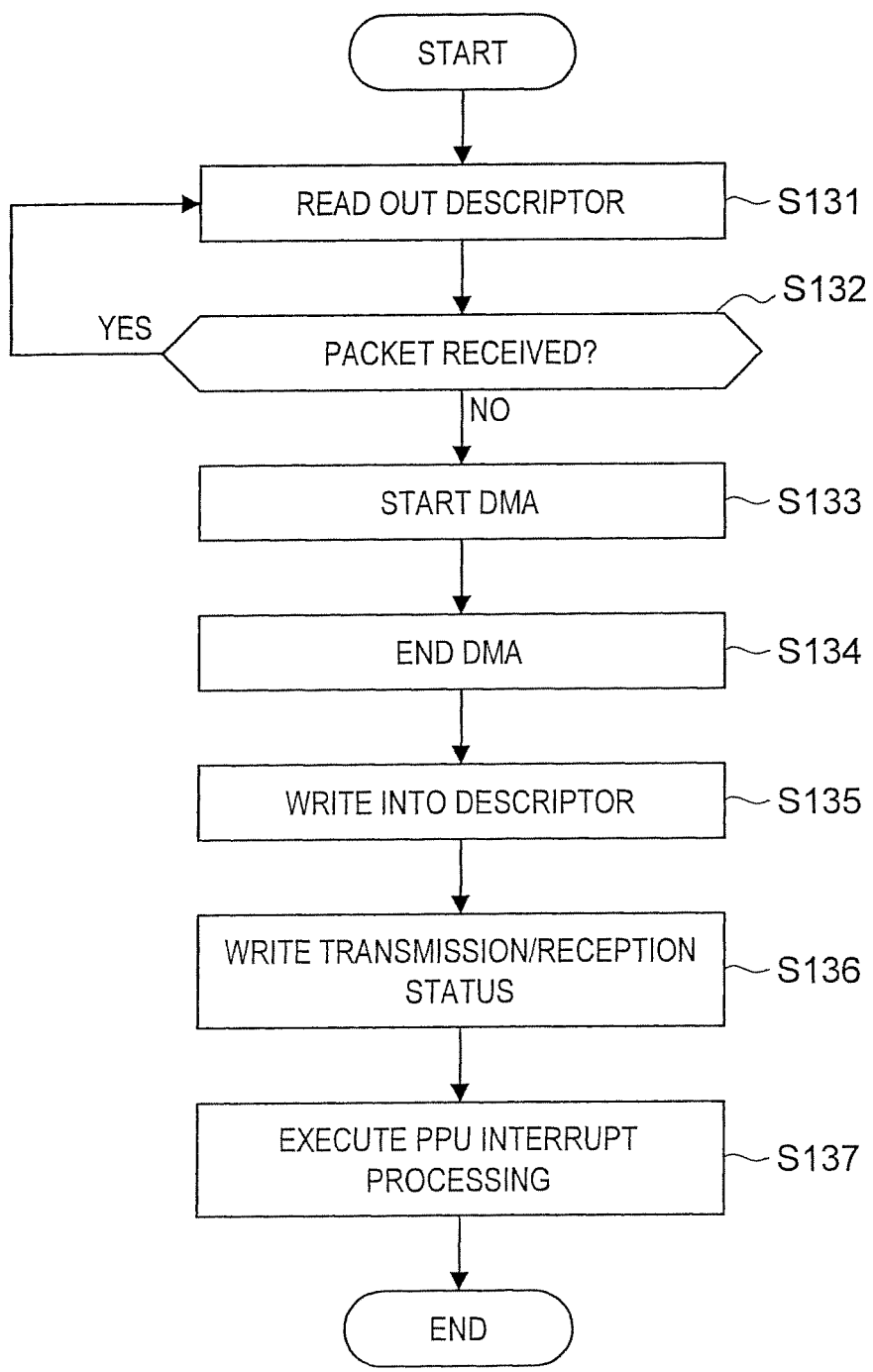
FIG. 5 presents a flowchart of the sequence of data reception processing executed via the network card based upon the descriptor.
Figure 6:
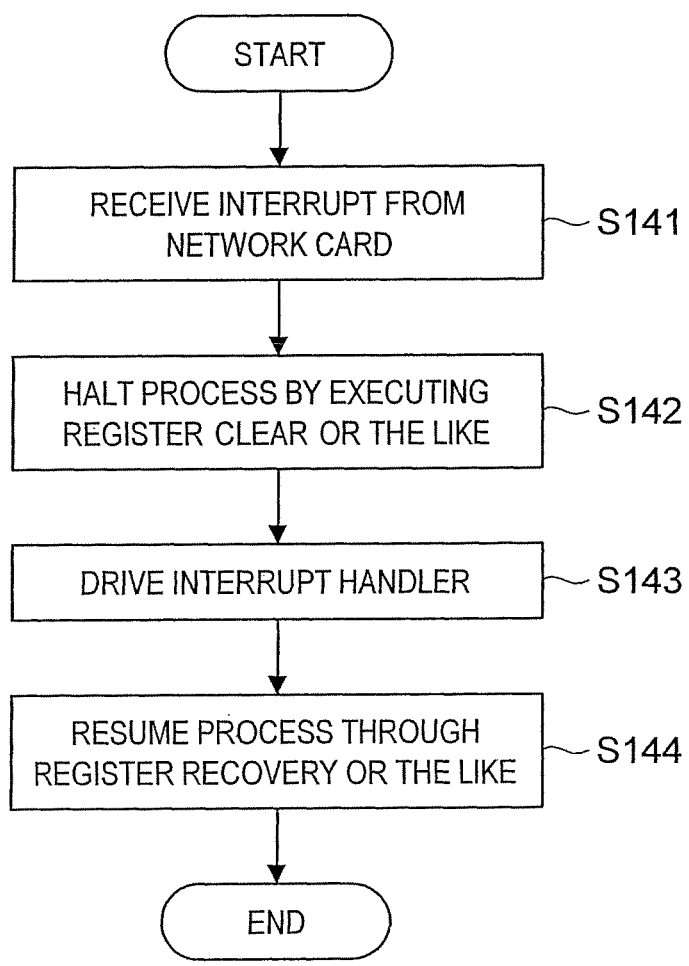
FIG. 6 presents a flowchart of the sequence of PPU interrupt processing executed in response to an interrupt notification from the network card.
Figure 7:
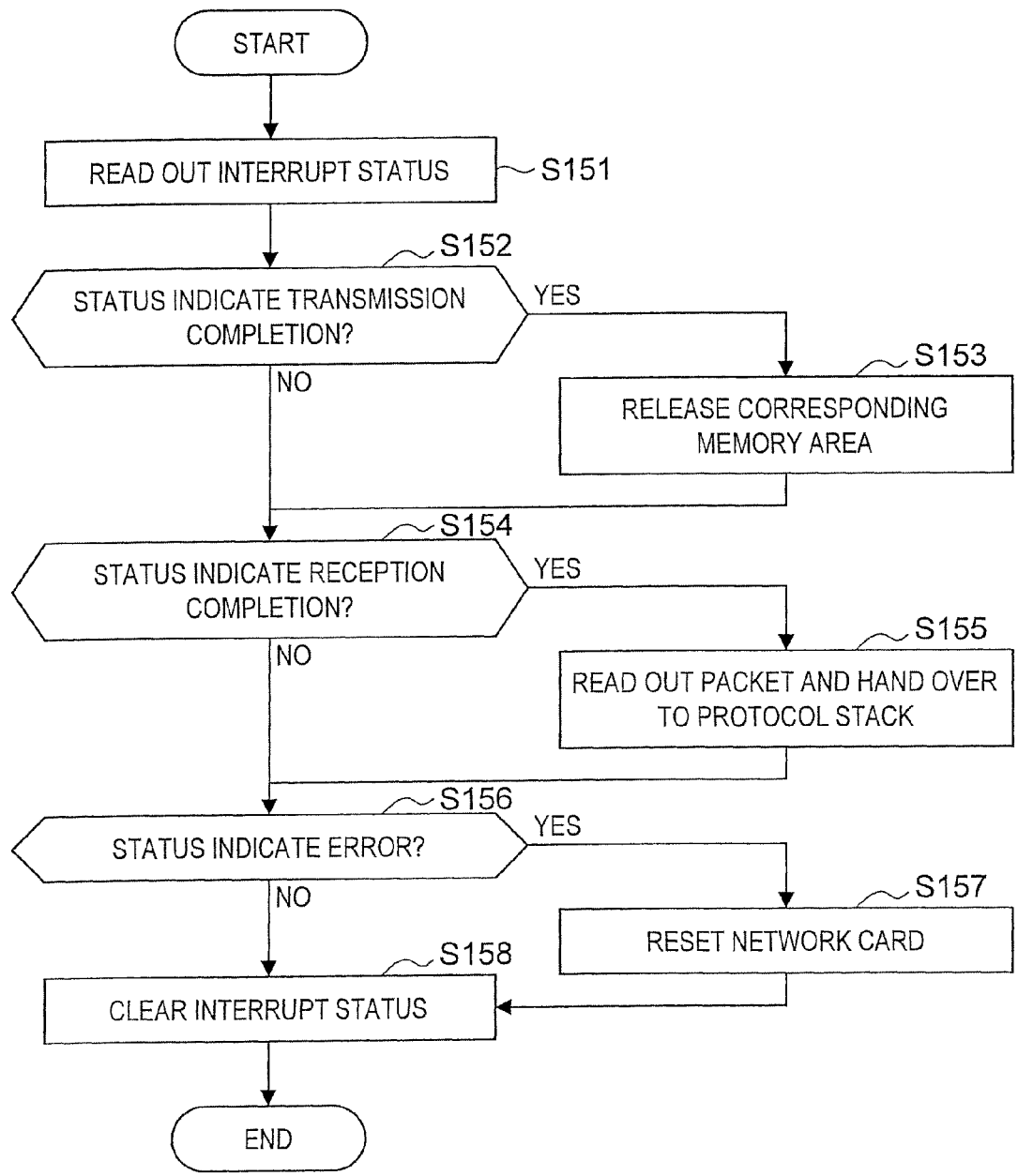
FIG. 7 presents a detailed flowchart of the sequence of interrupt handler startup processing.

The SPU controlling the device driver corresponding to the network card executes processing for reading out the status of the network card from the register corresponding to the network card in order to determine the cause of the interrupt in step S201. This status is equivalent to the data transmission/reception status indicating success or an error in the data transmission/reception, having been written via the network card in step S126 in FIG. 4 or step S136 in FIG. 5 explained earlier. If it is decided in step S202 that the status field is empty, the SPU returns to step S201 to repeatedly check the status.

If it is decided in step S203 that the status indicates that the transmission has been completed, the SPU releases the corresponding memory area where the transmission target data have been stored in step S204. If it is decided in step S205 that the status indicates that the reception has been completed, the SPU proceeds to step S206 to hand the received packet over to the protocol stack. If it is decided in step S207 that the status indicates an error, the SPU proceeds to step S208 to reset the network card. Finally, in step S209, the interrupt status is cleared and the interrupt processing thus ends.

Figure 13:
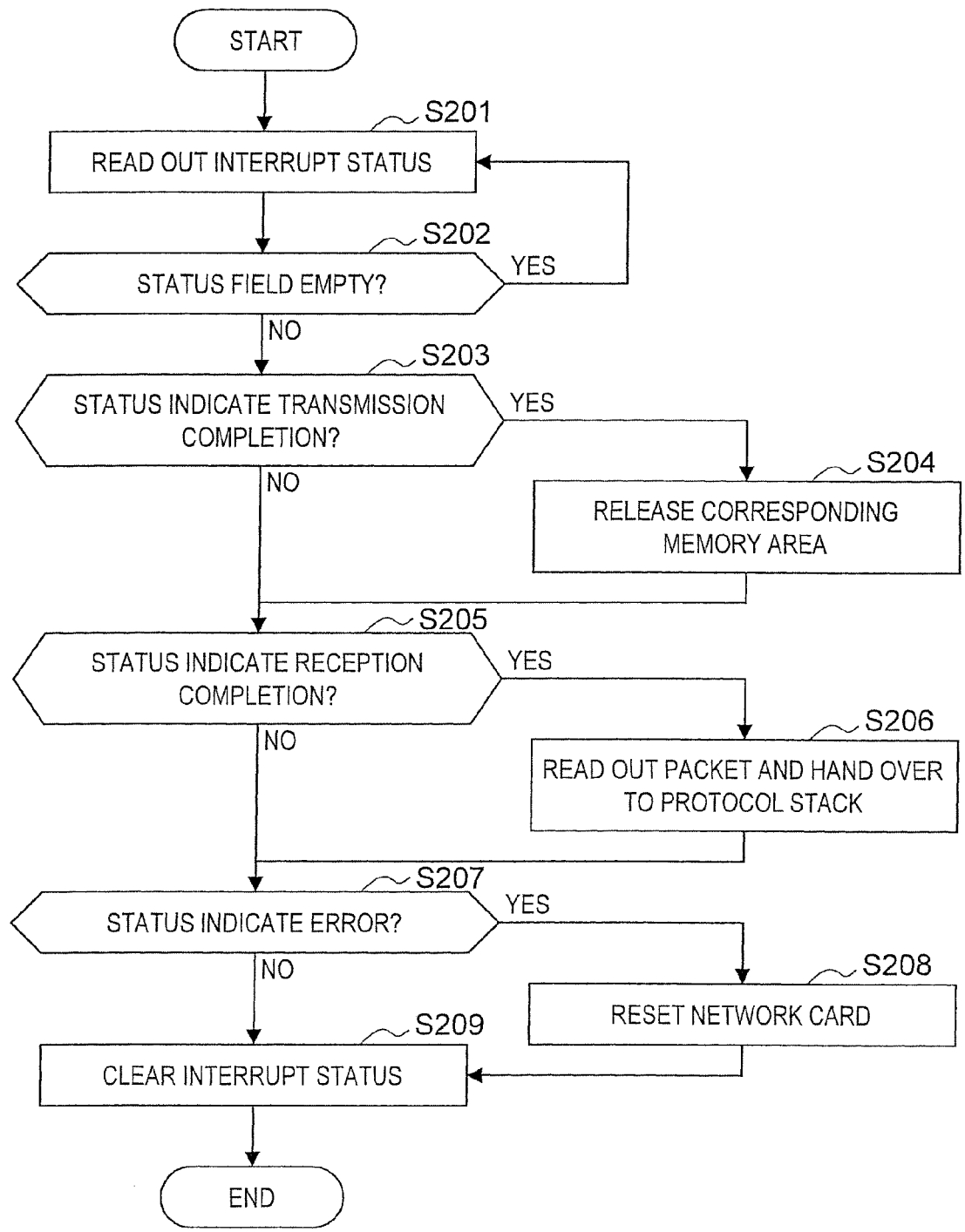
FIG. 13 presents a flowchart of the sequence of polled data transmission/reception completion processing.
Figure 14:
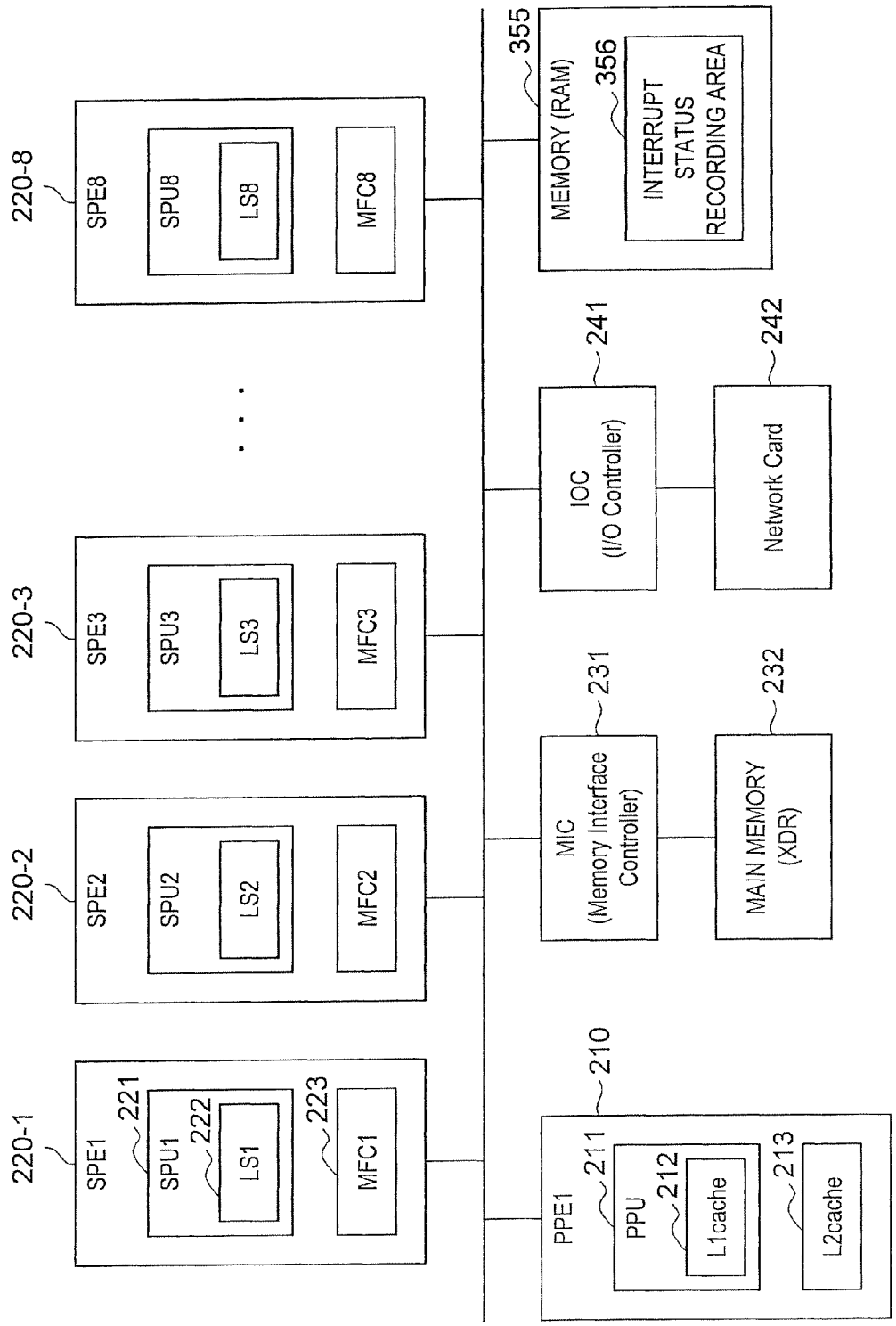
FIG. 14 presents a structural example that may be adopted to enable execution of processing for recording register value copy data into memory (RAM) that can be referenced by the SPUs.

It is to be noted that if the processing shown in FIG. 13 is to be repeatedly executed, the SPU assigned as the device driver control processor needs to check the interrupt status repeatedly. The interrupt status is recorded in the register corresponding to the network card and thus, the SPU needs to reference the register. A processing structure such as that shown in FIG. 14, through which network card processing is executed to record register value copy data into a memory (RAM) 355 that can be referenced by the SPUs simply requires the SPU to read the data in an interrupt status recording area 356 in the memory (RAM) 355 to ascertain the interrupt status. In this case, the SPU is able to ascertain the interrupt status by reading the data in the memory instead of through read access to the device register, which assures a higher processing speed than the processing that requires register referencing.

It is to be noted that the protocol stack 331 such as TCP or UDP is set as an execution target to be executed by the PPU 311 and the driver 350 corresponding to the network card 301 is set as an execution target to be executed by the SPU-1 (321-1) in the layer structure shown in FIG. 9. The sequences through which packet data may be transferred between the protocol stack and the driver in this layer structure are explained in reference to the flowcharts presented in FIGS. 15 and 16.

Figure 15:
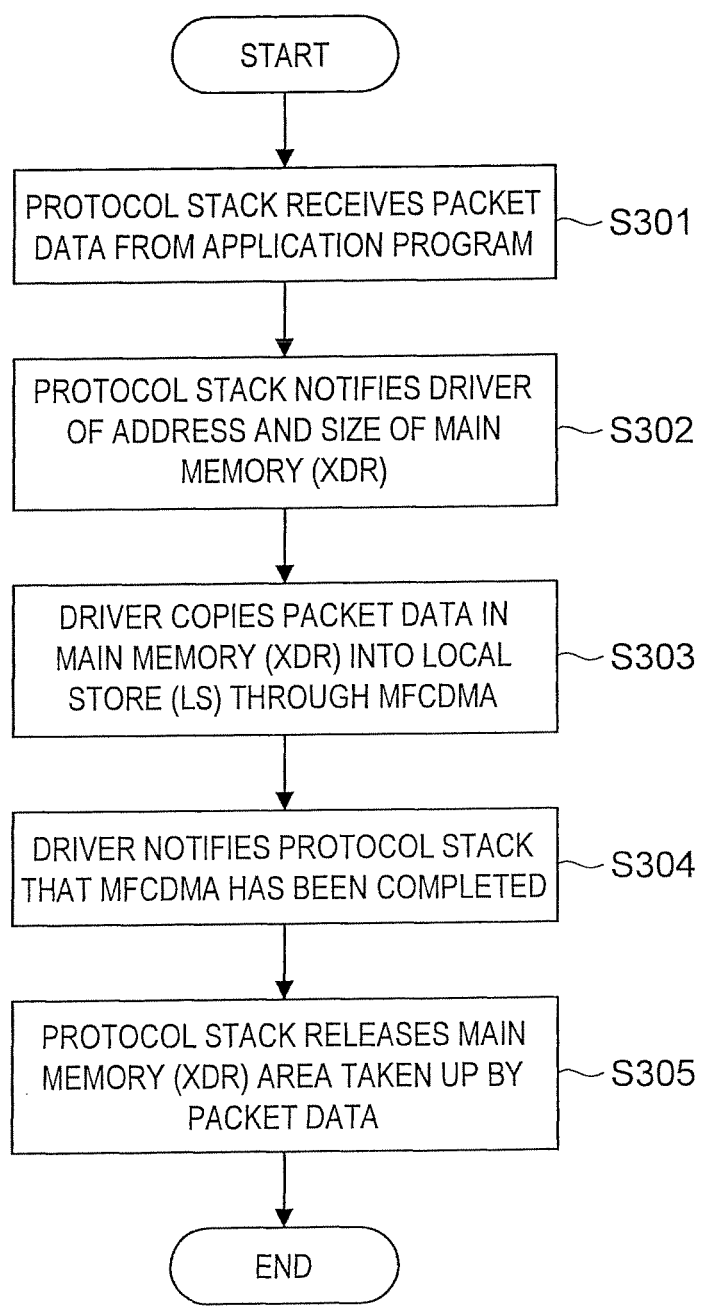
FIG. 15 presents a flowchart of the sequence of packet data transfer between the protocol stack and the driver.

The flowchart presented in FIG. 15 shows the sequence of packet data transfer between the protocol stack and the driver during data transfer processing executed via the network card 301. It is to be noted that since the present invention can be better understood in reference to an explanation provided by assuming that the application program is the main processing executor and, accordingly, the following description is given by assuming that the application program is the main executor of the processing in the flowchart. However, it goes without saying that the actual executor of the processing is the processor that executes the application program. In the data transmission processing, the transmission target packet data are received at the protocol stack 331, executed by the PPU 311 from the application program 340 (step S301). Next, in step S302, the protocol stack 331 notifies the driver of the address and the size of the main memory (XDR) where the packet data to be transmitted are to be stored.

Next, in step S303, the driver 350 executed by the SPU-1 (321-1) copies the packet data in the main memory (XDR) into the local store (LS) corresponding to the SPU-1 (321-1) through DMA executed via the memory flow controller (MFC). Then, in step S304, the driver 350 notifies the protocol stack 331 of the completion of the MFC DMA. Finally, in step S305, the protocol stack 331 releases the main memory area (XDR) having been taken up by the packet data.

Through this processing sequence, the data having been set as the transmission target by the application 340 are handed over from the protocol stack 331 to the driver 350. In addition, the data copied into the local store (LS) corresponding to the SPU-1 (321-1) are mapped into the I/O address space used as the address space for the network card 301 through the mapping processing explained earlier in reference to FIG. 12 and the transmission processing is executed via the network card 301.

Figure 16:
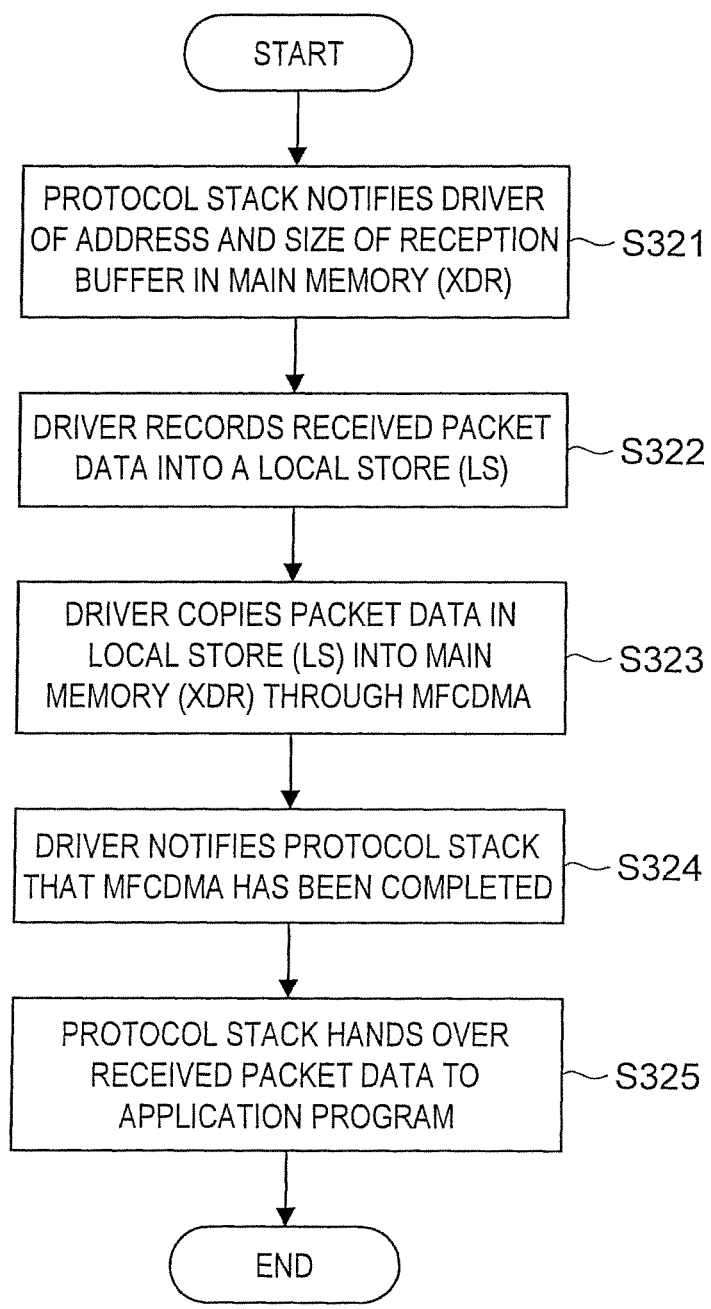
FIG. 16 presents a flowchart of the sequence of packet data transfer between the protocol stack and the driver.

Next, in reference to the flowchart presented in FIG. 16, the sequence of packet data transfer between the protocol stack and the driver during data reception processing executed via the network card 301 is explained. In the data reception processing, the protocol stack 331 executed by the PPU 311 notifies the driver 350 which is an execution target of the SPU-1 (321-1) of the address and size of the reception buffer at the main memory (XDR) in step S321.

Next, in step S322, the driver 350 records the received packet data having been received at the network card 301 into the local store (LS) corresponding to the SPU-1 (321-1). In step S323, the driver 350 executed by the SPU-1 (321-1) copies the packet data in the local store (LS) into the main memory (XDR) through DMA executed via the memory flow controller (MFC). Then, in step S324, the driver 350 notifies the protocol stack 331 of the completion of the MFC DMA. Finally, in step S325, the protocol stack 331 hands over the received packet data to the application program 340.

Through this processing sequence, the data to be received by the application program 340, first handed over from the driver 350 to the protocol stack 331, are provided to the application 340 from the protocol stack 331.

(Other Embodiments)

In the layer structure explained in reference to FIG. 9, a single sub-processor (the sub-processor SPU-1 (321-1) in the example presented in FIG. 9) is assigned to control the driver 350 corresponding to the network card. However, the present invention may be adopted in alternative layer structures as well. Such alternative layer structures are now described in reference to FIG. 17 and subsequent figures.

(Example in Which the Driver and the Protocol Stack are Executed by a SPU)

Figure 17:
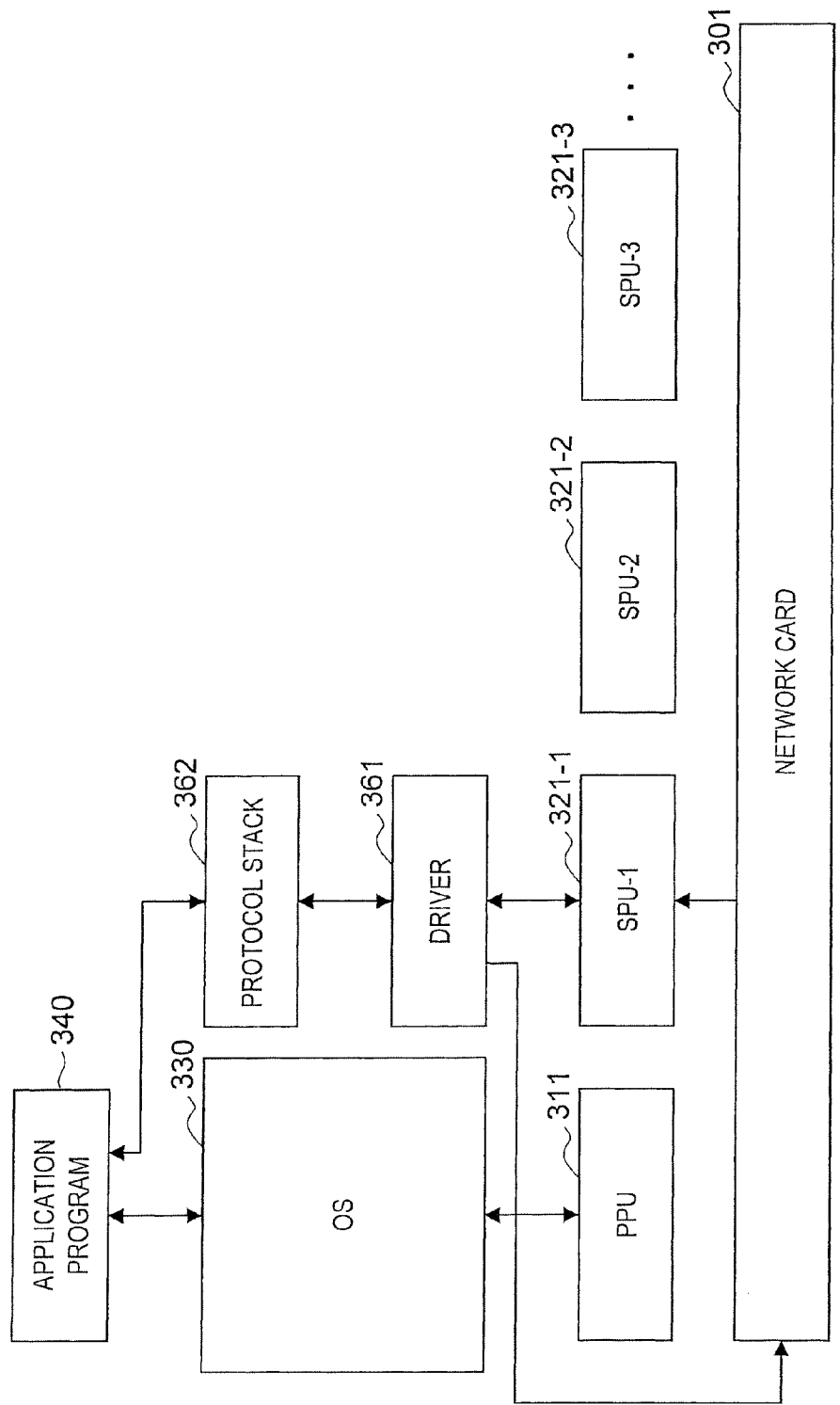
FIG. 17 presents a structural example that may be adopted to assign the execution of the driver and the protocol stack to an SPU.

In reference to FIG. 17, a structural example that may be adopted when assigning the execution of the driver and the protocol stack to an SPU is explained. FIG. 17 presents an example in which a given sub-processor, e.g., the SPU-1 (321-1), instead of the main processor PPU 311 designated as the OS execution processor, is designated to execute a protocol stack 362 in addition to a driver 361 corresponding to the network card.

Unlike in the structure having been explained in reference to FIG. 9, the protocol stack 362 is not controlled by the main processor PPU 311 in this embodiment. As a result, the processing load on the PPU 311 is further reduced. By adopting a structure in which the protocol stack is made to operate on an SPU, a protocol stack other than the protocol stack assigned to be executed by the PPU may be installed as an execution target of the SPU without affecting other standard application programs that use the protocol stack on the PPU. As a result, an advantage is achieved in that a protocol stack can easily be customized to assure optimal compatibility with the SPU with regard to the packet size and the resend algorithm.

(An Example in which the Driver, the Protocol Stack and the Application are Executed by a SPU)

Figure 18:
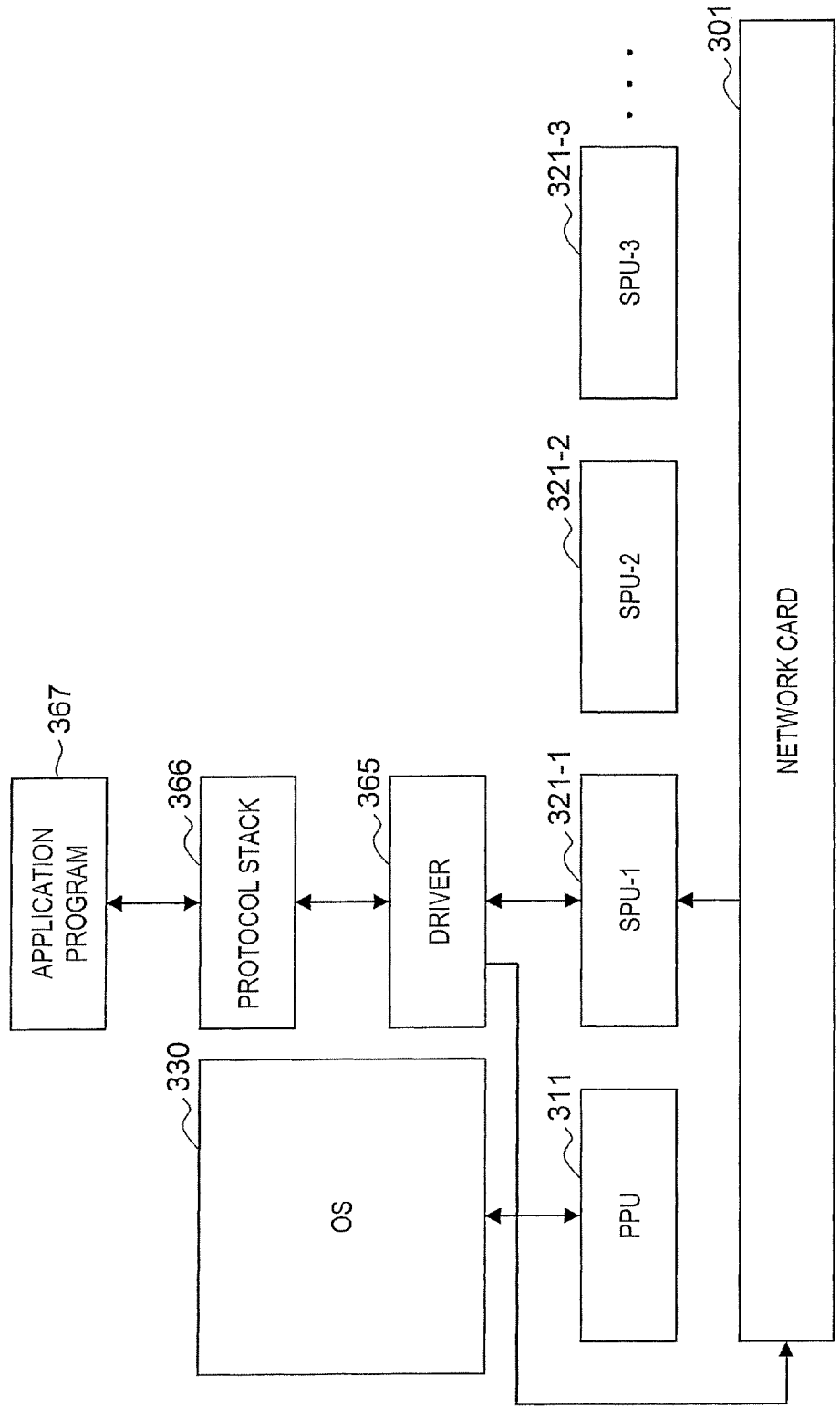
FIG. 18 presents a structural example that may be adopted to assign the execution of the driver, the protocol stack and the application to an SPU.

In reference to FIG. 18, a structural example that may be adopted when controlling the driver, the protocol stack and the application via an SPU is explained. FIG. 18 presents an example in which a given SPU, i.e., the SPU-1 (321-1) in the example presented in the figure instead of the PPU 311 is designated to execute a protocol stack 366 and an application program 367 as well as a driver 365 corresponding to the network card. It is to be noted that the application program 367 is an application program that executes communication processing by using the network card 301. Although not shown, there are other application programs present in the system and such application programs are executed by the PPU and the other SPUs.

As shown in FIG. 18, by installing the application 367 at the same SPU where the driver 365 and the protocol stack 366 are installed, the need to transfer packet data between the PPU and the SPU is eliminated and thus, data communication can be carried out completely unaffected by factors such as the performance level of and the load on the PPU.

(Examples in Which the Driver, the Protocol Stack and the Application are Executed by Different Processors Among the PPU and the SPUs)

Figure 19:
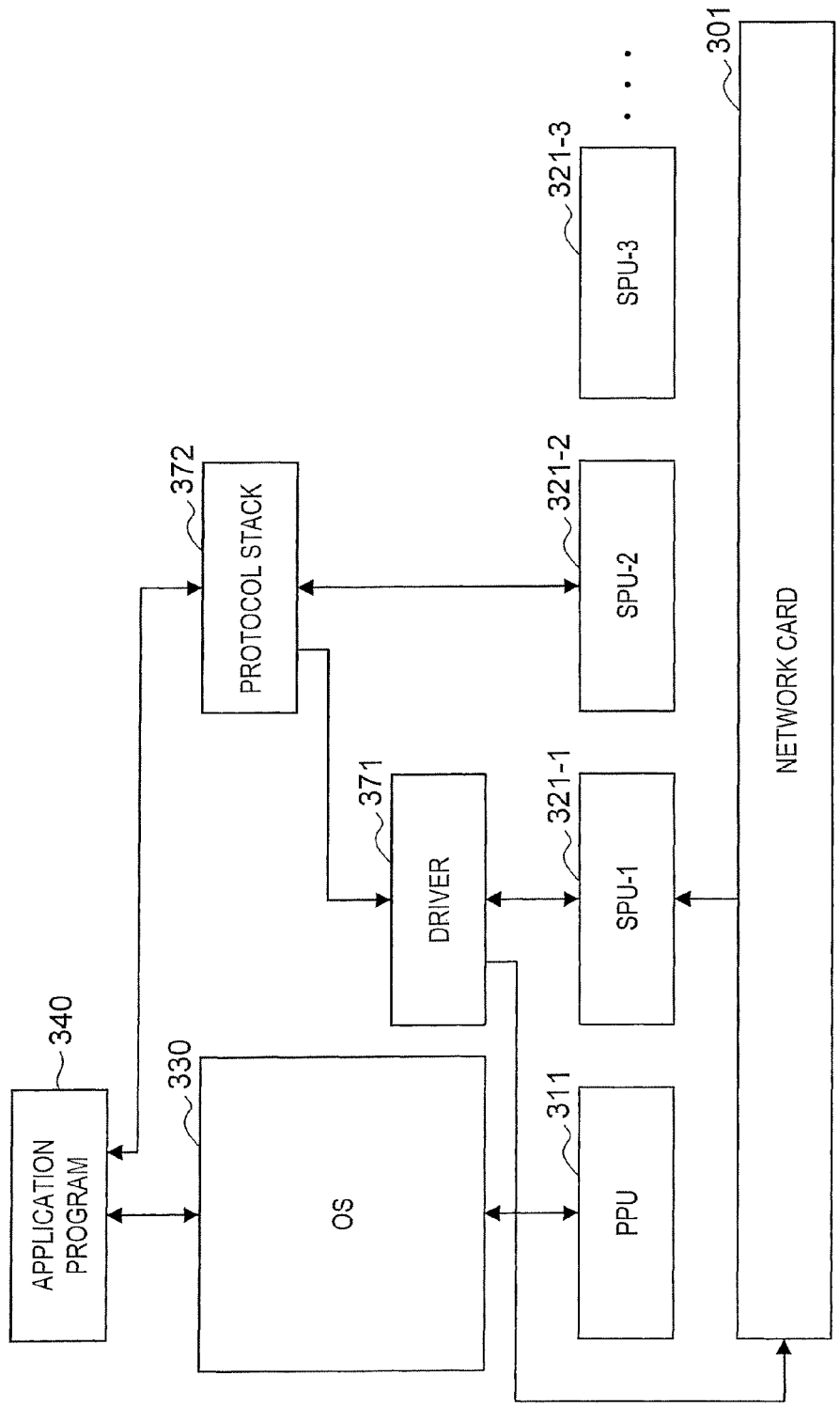
FIG. 19 presents a structural example that may be adopted to designate different processing units among the PPU and various SPUs to execute the driver the protocol stack and the application program.
Figure 20:
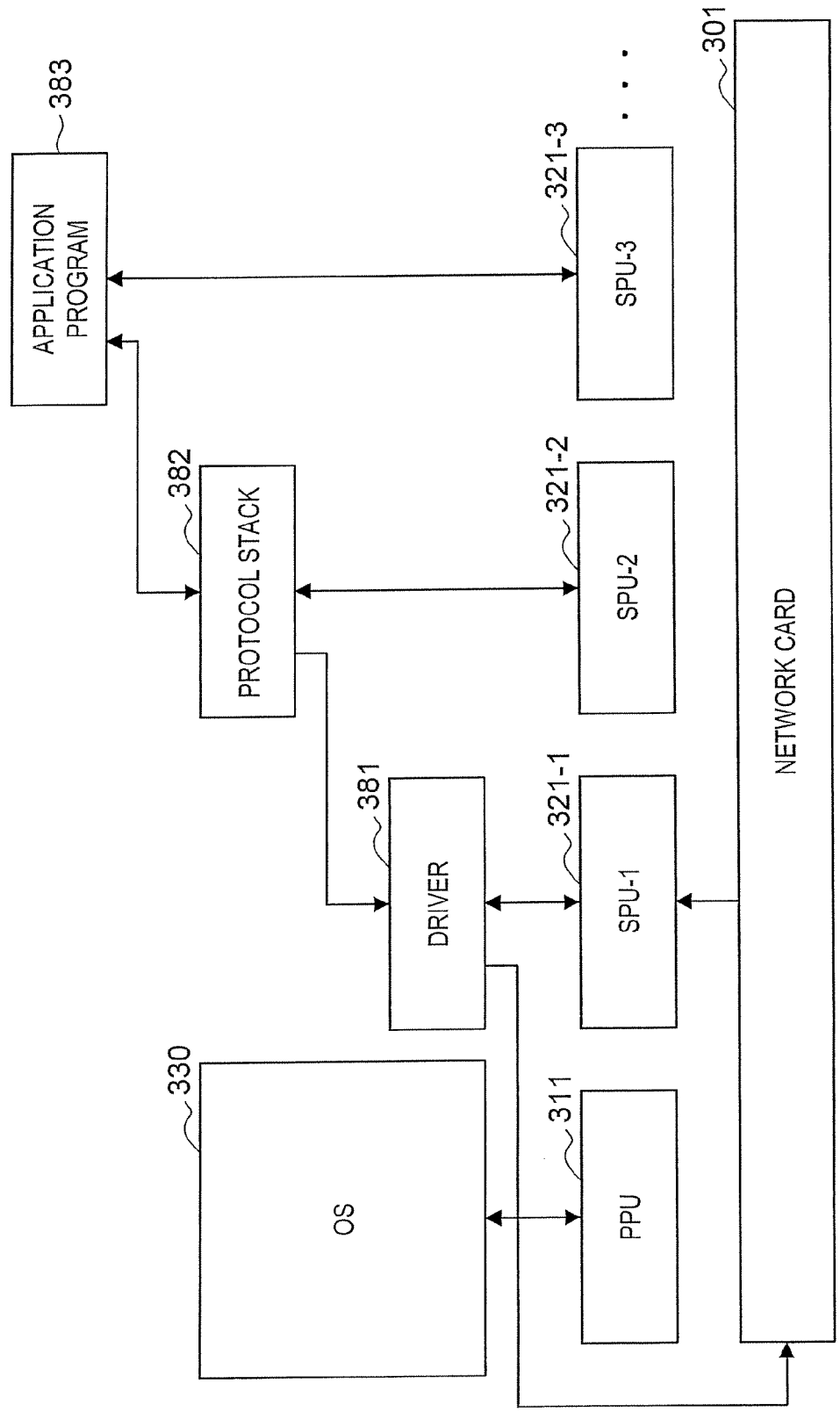
FIG. 20 presents a structural example that may be adopted to designate different processing units among the PPU and various SPUs to execute the driver the protocol stack and the application program.

Next, structural examples that may be adopted to execute the driver, the protocol stack and the application via different processors among the PPU and the SPUs are explained in reference to FIGS. 19 and 20. FIG. 19 presents a structural example in which a device driver 371, a protocol stack 372 and an application program 373 are executed by different processors among the PPU and the SPUs. In the example presented in FIG. 19, a driver 371 is executed by the SPU-1 (321-1), a protocol stack 372 is executed by the SPU-2 (321-2) and an application program 340 is executed by the PPU 311.

In the example presented in FIG. 20, a driver 381 is executed by the SPU-1 (321-1), a protocol stack 382 is executed by the SPU-2 (321-2) and an application program 383 is executed by the SPU-3 (321-3).

By adopting either of these structures, the processing load is dispersed over various processors so as to prevent the processing load on any given processor from becoming excessively heavy.

(Example in Which the Driver is Divided into a Transmission Portion and a Reception Portion to be Processed by Different SPUs)

Figure 21:
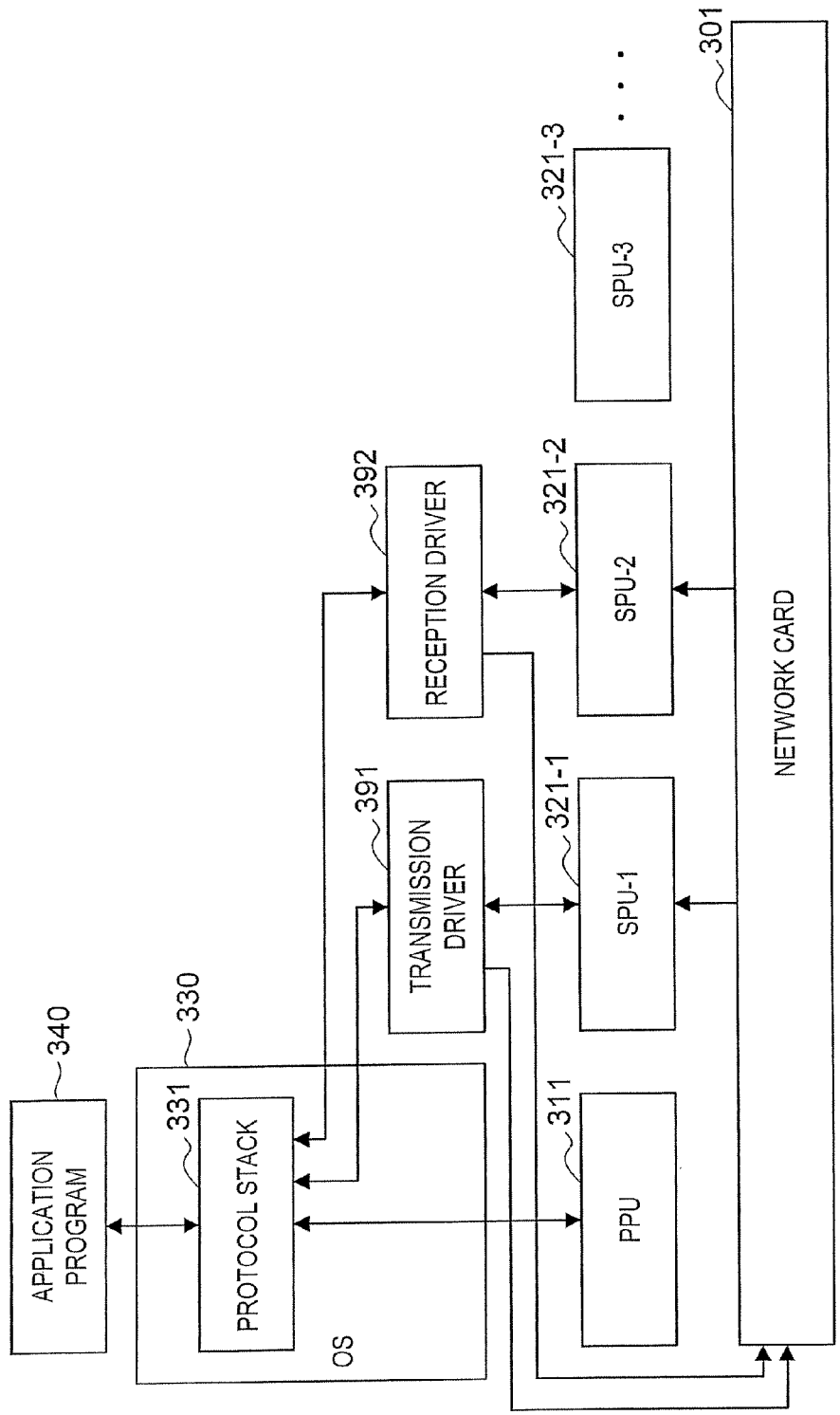
FIG. 21 presents a structural example that may be adopted to divide the driver corresponding to the network card into a transmission portion and a reception portion and execute the transmission portion and the reception portion via different SPUs.

Next, a structural example in which the driver corresponding to the network card is divided into a transmission portion and a reception portion to be processed by different SPUs is explained. FIG. 21 shows a structure in which the driver corresponding to the network card 301 is divided into a transmission portion and a reception portion, with a transmission driver 391 executed by the SPU-1 (321-1) and a reception driver 392 executed by the SPU-2 (321-2). The structure allows different processors to control the drivers corresponding to the data transmission processing and the data reception processing.

(Example in Which Different SPUs are Assigned to Control Protocol Stacks each Corresponding to a Specific Protocol Type)

Figure 22:
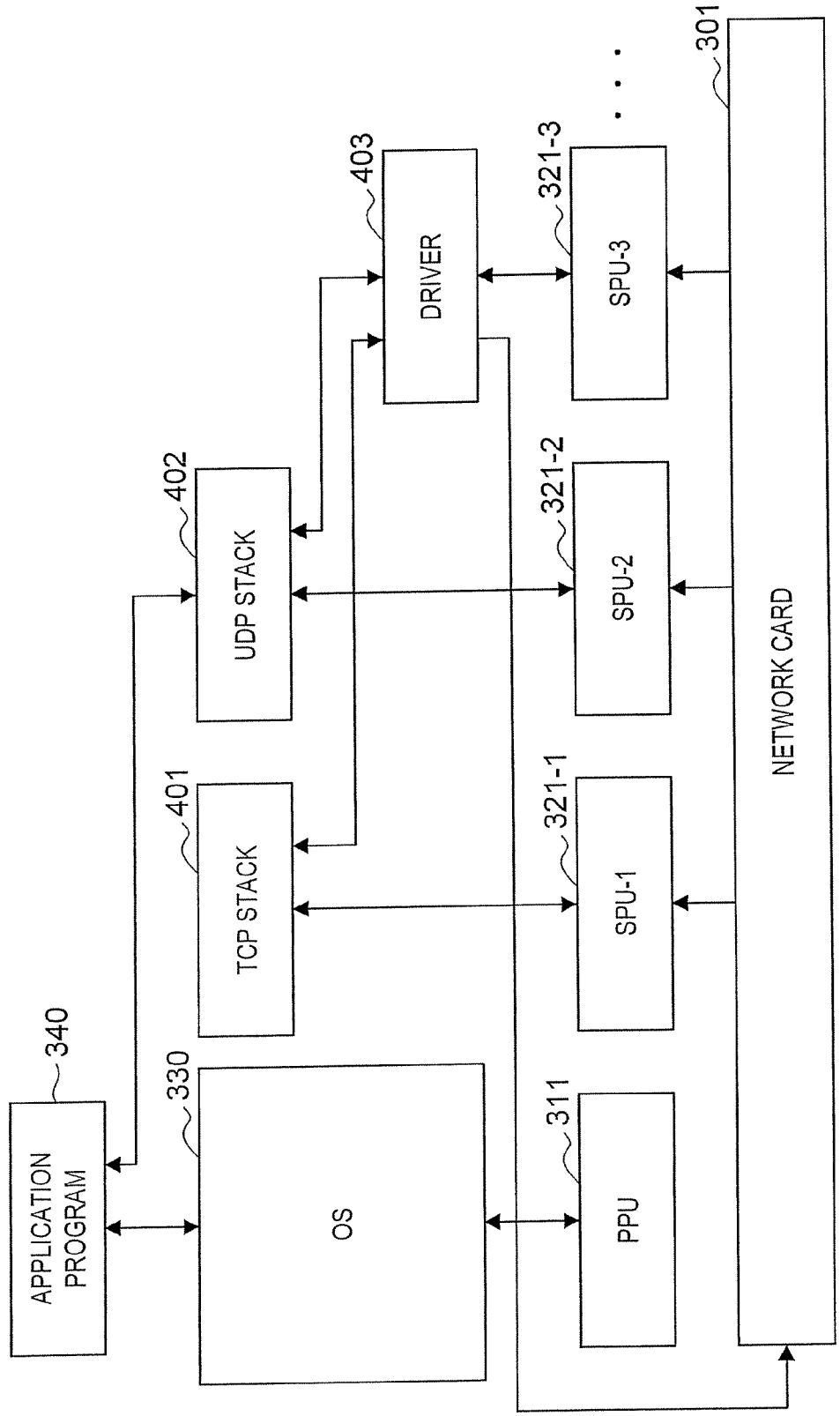
FIG. 22 presents a structural example that may be adopted to engage different SPUs in protocol stack execution, each in correspondence to a specific protocol type.

Next, a structural example in which different SPUs are assigned to control protocol stacks each corresponding to a specific protocol type is explained. FIG. 22 shows a structure in which the protocol stack is divided into a TCP protocol stack and a UDP protocol stack with the TCP protocol stack 401 executed by the SPU-1 (321-1) and the UDP protocol stack 402 executed by the SPU-2 (321-2). It is to be noted that in the structure shown in FIG. 22, a driver 403 is executed by the SPU-3 (321-3).

The structure allows different SPUs to engage in control each in correspondence to a specific protocol and, as a result, a processing structure through which a specific processor is able to execute processing customized for a specific protocol can be achieved with ease.

It should be understood by those skilled in the art that various modifications, combinations, sub combinations and alterations may occur depending upon design requirements and other factors in so far as they are within the scope of the appended claims or equivalent thereof.

It is to be noted that the sequences of processing described in the specification may be executed in hardware, in software or in a structure achieved by combining specific hardware and software configurations. The processing sequences may be executed based upon software by installing a program having recorded therein the processing sequences in a memory in a computer built into a dedicated hardware unit and executing this program or by installing such a program in an all-purpose computer capable of executing various types of processing and executing the program.

For instance, the program may be recorded in advance in a hard disk or a ROM (read only memory) used as a recording medium. Alternatively, the program may be temporarily or permanently stored (recorded) in a removable recording medium such as a flexible disk, a CD-ROM (compact disk read-only memory), an MO (magneto-optical) disk, a DVD (digital versatile disk), a magnetic disk or a semiconductor memory. Such a removable recording medium may be provided as a packaged software program product.

It is to be noted that instead of installing the program in a removable recording medium into a computer, it may be wirelessly transferred from a download site into a computer. Alternatively, the program may be transferred to a computer through a wired connection via a network such as a LAN (local area network) or the Internet and the computer having received the program transferred thereto may install the program into a recording medium such as an internal hard disk.

It is to be noted that while an explanation is given above in reference to the embodiment on an example in which the present invention is adopted in conjunction with the TCP/IP protocol, the present invention may instead be adopted in conjunction with another protocol such as RTP/UDP/IP.

It is to be noted that the various types of processing described in the specification may be executed in time sequence as described or they may be executed concurrently or individually depending upon the processing capability of the apparatus executing the processing or as required. In addition, the term "system" used in the specification refers to a logical aggregate structure that includes a plurality of devices assuming various structures, which are not necessarily installed in a single case.

As described above, according to the embodiments of the present invention, a sub-processor (an SPU in the CELL), different from the main processor (the PPU in the CELL) executing control in the operating system (OS) is designated to control the device driver corresponding to the communication unit and thus, the communication control is executed by the sub-processor in response to an interrupt originating from a network card functioning as the communication unit in an information processing apparatus equipped with a plurality of processors and engaged in communication via a network. As a result, data processing can be executed at the main processor with a high level of efficiency without a time lag in the data processing.

What is claimed is:

1. An information processing apparatus equipped with a plurality of processors in an asymmetrical multiprocessor environment, comprising:
    a first processor that executes processing based upon an operating system, wherein the first processor is the only processor in the information processing apparatus that executes processing based upon the operating system;
    a communication unit that executes communication processing; and
    a second processor, separate from the first processor, that executes processing based upon a device driver corresponding to the communication unit.

2. An information processing apparatus according to claim 1, wherein:
    the second processor reads out an interrupt status set by the communication unit, determines processing to be executed based upon the interrupt status having been read out and executes the processing thus determined.

3. An information processing apparatus according to claim 2, wherein:
the second processor;
releases a storage area in a memory where transmission target data are stored if the interrupt status having been set by the communication unit indicates that transmission has been completed;
processes received data based upon a protocol stack if the interrupt status indicates that reception has been completed; and
executes reset processing for the communication unit if the interrupt status indicates an error.

4. An information processing apparatus according to claim 2, wherein:
the second processor repeatedly executes read processing for reading out the interrupt status having been set by the communication unit.

5. An information processing apparatus according to claim 2, wherein:
the communication unit writes the interrupt status into a register area corresponding to the communication unit and executes copy processing for copying the interrupt status into a memory area accessible by the second processor; and
the second processor obtains the interrupt status having been set by the communication unit from the memory area.

6. An information processing apparatus according to claim 1, having installed therein:
an application program that enables communication via the communication unit; and
a protocol stack that enables execution of communication control processing corresponding to a communication protocol adopted in data communication executed via the communication unit, wherein:
when data communication is executed via the communication unit, communication data are transferred between the protocol stack and the device driver.

7. An information processing apparatus according to claim 6, wherein:
the protocol stack is executed by the first processor; and
the communication data transfer between the protocol stack and the device driver, which is executed by the second processor, is carried out as processing that includes data copy processing whereby data are copied between a main memory installed in the information processing apparatus and a local store set in correspondence to the second processor.

8. An information processing apparatus according to claim 1, wherein:
the second processor executes processing based upon a protocol stack that enables execution of communication control processing corresponding to a communication protocol adopted in data communication executed via the communication unit.

9. An information processing apparatus according to claim 1, wherein:
the second processor executes an application program that enables communication via the communication unit.

10. An information processing apparatus according to claim 1, further comprising:
a third processor that executes processing based upon a protocol stack that enables execution of communication control processing corresponding to a communication protocol adopted in data communication executed via the communication unit.

11. An information processing apparatus according to claim 1, further comprising:
a third processor that executes processing based upon a protocol stack that enables execution of communication control processing corresponding to a communication protocol adopted in data communication executed via the communication unit; and
a fourth processor that controls an application program that enables communication via the communication unit.

12. An information processing apparatus according to claim 1, wherein:
the device driver corresponding to the communication unit is constituted with a transmission driver corresponding to data transmission processing executed via the communication unit and a reception driver corresponding to data reception processing executed via the communication unit, with the transmission driver and the reception driver executed by different processors.

13. An information processing apparatus according to claim 1, wherein:
different processors are each designated as a processor that executes processing based upon a protocol stack which enables execution of communication control processing corresponding to a specific communication protocol adopted in data communication executed via the communication unit.

14. An information processing method adopted in an information processing apparatus equipped with a plurality of processors in an asymmetrical multiprocessor environment, comprising:
a step in which a second processor, separate from a first processor that is the only processor in the information processing apparatus that executes processing based upon an operating system, executes processing based upon a device driver corresponding to a communication unit;
a step in which the second processor executes read processing to read out an interrupt status set by the communication unit; and
a step in which the second processor determines processing to be executed based upon the interrupt status having been read out and executes the determined processing.

15. A non-transitory computer-readable medium storing instructions, which, when executed by a processor of an information processing apparatus equipped with a plurality of processors in an asymmetrical multiprocessor environment to execute communication processing control, causes the processor to perform a method comprising:
a step in which a second processor, separate from a first processor that is the only processor in the information processing apparatus that executes processing based upon an operating system executes processing based upon a device driver corresponding to a communication unit
a step in which the second processor executes read processing to read out an interrupt status set by a communication unit; and
a step in which the second processor determines processing to be executed based upon the interrupt status having been read out and executes the determined processing.

16. An information processing apparatus in an asymmetrical multiprocessor environment, comprising:
a main processor configured to execute programs based upon an operating system;
a communication unit configured to execute communication processing;

a sub-processor configured to install therein a device driver corresponding to the communication unit and to process an interrupt from the communication unit, wherein the sub-processor is not configured to execute programs based upon the operating system.

17. An information processing apparatus according to claim 16, wherein the sub-processor is configured to read out an interrupt status set by the communication unit, determine processing to be executed based upon the interrupt status, and execute the determined processing.

18. An information processing apparatus according to claim 16, wherein sub-processor executes processing based upon a protocol stack that enables execution of communication control processing corresponding to a communication protocol adopted in data communication executed via the communication unit.

19. An information processing apparatus according to claim 16, further comprising another sub-processor that executes processing based upon a protocol stack that enables execution of communication control processing corresponding to a communication protocol adopted in data communication executed via the communication unit.

* * * * *